US011969387B2

(12) United States Patent
Arguello et al.

(10) Patent No.: US 11,969,387 B2
(45) Date of Patent: Apr. 30, 2024

(54) KIT, TOOLS, AND METHOD FOR TREATMENT OF FACIAL INJURIES AND DISORDERS

(71) Applicant: BOARD OF REGENTS, THE UNIVERSITY OF TEXAS SYSTEM, Austin, TX (US)

(72) Inventors: Lori Arguello, League City, TX (US); Kathleen Kerr, Friendswood, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 549 days.

(21) Appl. No.: 16/959,402

(22) PCT Filed: Jan. 4, 2019

(86) PCT No.: PCT/US2019/012385
§ 371 (c)(1),
(2) Date: Jun. 30, 2020

(87) PCT Pub. No.: WO2019/136276
PCT Pub. Date: Jul. 11, 2019

(65) Prior Publication Data
US 2021/0369531 A1 Dec. 2, 2021

Related U.S. Application Data

(60) Provisional application No. 62/613,734, filed on Jan. 4, 2018.

(51) Int. Cl.
*A61H 1/02* (2006.01)
*A61B 5/107* (2006.01)
(Continued)

(52) U.S. Cl.
CPC ................. *A61H 1/02* (2013.01); *A61H 1/00* (2013.01); *A61H 2201/0103* (2013.01);
(Continued)

(58) Field of Classification Search
CPC .......... A61H 1/02; A61H 7/003; A61H 7/005; A61H 2201/1607; A61H 2205/022; A61H 2201/1253
See application file for complete search history.

(56) References Cited

U.S. PATENT DOCUMENTS 6,524,225 B1 * 2/2003 Arias .................. A63B 23/032 482/11
6,524,255 B2 2/2003 Arias
(Continued)

FOREIGN PATENT DOCUMENTS

JP 2016189937 A 11/2016
WO WO-2011019948 A1 * 2/2011 ............. A61F 5/566
WO 2011019948 A1 4/2019

OTHER PUBLICATIONS

Atiyeh, F.SI, et al., "Pressure Garment Therapy (PGT) of Burn Scars: Evidence-Based Efficacy", Annals of Buns and Fire Disasters, vol. XXVI, Dec. 4, 2013.
(Continued)

*Primary Examiner* — Thaddeus B Cox
*Assistant Examiner* — Joshua Daryl D Lannu
(74) *Attorney, Agent, or Firm* — Edwin S. Flores; Daniel J. Chalker; Chalker Flores, LLP

(57) ABSTRACT

The present invention includes an intraoral tool, including one or more selected solid or inflatable inserts targeted to provide a low load prolonged stretch to orofacial musculature that may be coupled to tool handle or tool mounting bracket, wherein the intraoral tool is configured for a delivery of intraoral treatment, such as a stretch to a patient's
(Continued)

facial injury or disorder and configured to permit manipulation of the insert in the patient's mouth.

19 Claims, 25 Drawing Sheets

(51) Int. Cl.

| | |
|---|---|
| ***A61B 90/00*** | (2016.01) |
| ***A61F 2/50*** | (2006.01) |
| ***A61F 5/042*** | (2006.01) |
| ***A61H 1/00*** | (2006.01) |
| ***A63B 23/00*** | (2006.01) |

(52) U.S. Cl.

CPC ................ *A61H 2201/0173* (2013.01); *A61H 2201/0192* (2013.01); *A61H 2201/1253* (2013.01); *A61H 2201/1607* (2013.01); *A61H 2201/1685* (2013.01); *A61H 2201/169* (2013.01); *A61H 2205/022* (2013.01); *A61H 2205/026* (2013.01)

(56) References Cited

U.S. PATENT DOCUMENTS

| | | | | |
|---|---|---|---|---|
| 6,524,262 | B1 | 2/2003 | Akihiro | |
| 2014/0018710 | A1* | 1/2014 | Israel ....................... | A61H 1/02 601/5 |
| 2015/0282798 | A1* | 10/2015 | Uphoff ................. | A63B 23/032 433/140 |
| 2015/0327955 | A1* | 11/2015 | Hanswirth ........... | A63B 21/028 128/862 |

OTHER PUBLICATIONS

N. A. Clayton et al., "Intensive swallowing and orofacial contracture rehabilitation after severe burn: A pilot study and literature review", Elsevier, Burns 43, 2017, e7-e17.
N. A. Clayton et al., "Orofacial contracture management outcomes following partial thickness facial burns", Elsevier, Burns 41, 2015, 1291-1297.
N. A. Clayton et al., "Orofacial Contracture Management: Current Patterns of Clinical Practice in Australian and New Zealand Adult Burn Units", Journal of Burn Care & Research, vol. 38, No. 1.
Coulson, Susan et al., "Quantification of the Three-Dimensional Displacement of Normal Facial Movement", Ann Otol Rhinol Laryngol, 109:2000/.
Feng, Guodong et al., "Measurement and analysis of associated mimic muscle movements", Elsevier, Journal of Otology, 10, 2015, 39-45.
Hadlock, Tessa, et al., "Toward a Universal, Automated Facial Measurement Tool in Facial Reanimation", Arch Facial Plast Surg/ vol. 14 (No. 4), Jul./Aug. 2012.
Jorge J. et al., "Objective computorized evaluation of normal patterns of facial muscles contraction", Braz J Otorhinolaryngol, 2012;78(2):41-51. Bjorl.
Macintyre, Lisa et al., "Pressure garments for use in the treatment of hypertrophic scars—a review of the problems associated with their use", Elsevier, Burns 32 (2006) 10-15, Burns.
Marur, Tania, et al., "Facial anatomy", Elsevier, Clinics in Dermatology (2014) 32, 14-23.
Parry, Ingrid et al., "Nonsurgical Scar Management of the Face: Does Early Versus Late Intervention Affect Outcome?", Journal of Burn Care & Research, Sep./Oct. 2013.
VanSwearingen, Jessie et al., "The Facial Disability Index: Reliability and Validity of a Disability Assessment Instrument for Disorders of the Facial Neuromuscular System", Physical Therapy. vo. 76 . No. 12 . Dec. 1996.

* cited by examiner

KIT, TOOLS, AND METHOD FOR TREATMENT OF FACIAL INJURIES AND DISORDERS

CROSS-REFERENCE TO RELATED APPLICATIONS

This application is the National Stage of International Application No. PCT/US2019/012385, filed on Jan. 4, 2019 claiming the priority of U.S. Provisional Application Ser. No. 62/613,734, filed Jan. 4, 2018, the content of each of which is incorporated by reference herein.

TECHNICAL FIELD OF THE INVENTION

The present invention relates in general to the field of treatment of facial injuries and disorders such as, e.g., facial burns, hypertonic facial muscles, cerebral palsy, lip contractures following cleft lip surgery, and oral motor deficits. More specifically, the present invention relates to the use of devices and methods for passive stretch treatments and range of motion treatments to improve the range of motion in patients with one or more facial injuries or disorders, to reduce the impact of the one or more injuries or disorders, and to improve the appearance of scar tissue.

BACKGROUND OF THE INVENTION

Without limiting the scope of the invention, its background is described in connection with a tool for delivery of treatment of facial-burn patients, a method of treatment, and a kit for treatment.

Facial injuries and disorders such as, e.g., facial burns can impact oral motor function, swallowing, speech articulation, oral hygiene, and facial expression. To date, there is no definitive prescriptive regime for rehabilitative management of facial burns. The techniques now used include external stretching interventions, massage, compression garments, range of motion exercises, oral splints, and z-plasties to the oral commissures, among others. The prior art shows some success in functional outcomes with treatment methodologies that are currently available, but there is limited data available to determine the specifics of a treatment plan, especially relating to the timing and frequency of chosen techniques.

For example, the references of Clayton, N. A. et al. [1, 2], disclose at least two potential orofacial and dysphagia rehabilitation protocols including range of motion exercises, mouth splinting, the use of the OraStretch™ device, and two dysphagia exercises. The references by Clayton et al., referenced herein reported functional gains in patients' dysphagia and vertical range of motion (VROM) and horizontal range of motion (HROM) of oral musculature.

A pressure garment is also widely used as therapeutic tool. For example, the references of Macintyre et al. [3]; and Atiyeh, B. S. et al. [4] disclose that compression garments can be used to decrease blood flow, nutrients, and oxygen to the scar tissue, thereby reducing collagen synthesis. It is well documented that pressure garments must be worn for at least 23 hours per day and for greater than six months to obtain the maximum benefits. Challenges of pressure garment use include non-compliance with treatment and patient discomfort from poor fit or weather, among other issues. Evidence specifying the exact pressure needed to obtain the desired result is lacking. The challenges of identifying and maintaining the optimum pressure have been documented, according to Atiyeh et al. [4]. Most patients known to the inventors of the present invention have used pressure garments, resulting in improved scar appearance but continued oral motor deficits and severely restricted ROM.

In addition to the challenges with use of specific tools such as pressure garments, no consistent protocol exists for active or passive range or motion (ROM) or stretching. Clayton, N. A. et al. [5]. The OraStretch™ and TheraBite® devices provide alternatives for jaw opening but, similar to other tools mentioned herein, do not directly address common problem areas including restricted ROM and scarring to the lips, cheeks, nasolabial folds, mentolabial junction, modiolus, and forehead.

In clinical treatment settings, the inventors have encountered significant challenges in the ROM and elasticity of the facial skin and muscles in the lips, cheeks, nasolabial folds, mentolabial junction, modiolus, and forehead, and they have attempted to treat these deficits using a combination of the most widely known techniques, including the Beckman Oral Motor Protocol. The Beckman Oral Motor Protocol is typically used as an oral motor treatment in other populations, but it was trialed by the inventors of the present invention as a potential treatment method to improve range of motion of oral musculature following facial burns. Use of the Beckman Oral Motor Protocol did not achieve the desired results in the trials, largely due to the brief nature of the stretches and poor carryover by caregivers in completing the required repetitions.

Another device is taught in U.S. Pat. No. 3,938,508, issued to Bucker, "Oral appliance for burn patients," and is said to disclose an oral appliance for persons who have suffered facial burns to prevent shrinkage of the tissues around the mouth and lips during the healing process (microstomia). The appliance is said to be adjustable to fit the patient's mouth and to be capable of being enlarged to progressively widen the opening of the mouth if shrinkage has already occurred. It is said that it may be employed to prevent shrinkage of the mouth and the lips by other causes (scleroderma, etc.).

Yet another device is taught in U.S. Pat. No. 4,909,502, issued to Beeuwkes, III, et al., "Passive jaw exerciser," and is said to disclose a passive jaw exerciser for application of an anatomically applied jaw moving force for pivoting of the jaw at its tempero-mandibular joint or to provide a motion to the jaw which is beneficial in facial orthopedics. Further, this patent is said to disclose a body structure having guide tracks which guide movement of a carriage according to the character of movement that is desired, where the carriage is movable by a lever operated push rod to thereby cause corresponding movement of a mandibular jaw piece supported by a carriage relative to a maxillary jaw piece supported by the exerciser body. The position of engagement between the lever and the push rod is said to be adjustable through selection of any one of a number of spaced slots that are formed in parallel webs of the lever structure.

Furthermore, U.S. Pat. No. 5,035,420, issued to Beeuwkes, III, et al., "Jaw exerciser," is said to disclose an exerciser for application of an anatomically applied force to the jaw for pivoting of the jaw at its tempero-mandibular joint or to provide a motion to the jaw, or resistance to motion of the jaw which is beneficial in facial orthopedics. Further, this patent is said to disclose a structure having curvilinear guide tracks which guide movement of a carriage according to the character of movement that is desired, where the carriage is movable to thereby allow corresponding movement of a mandibular jaw member supported by the carriage relative to a maxillary jaw member supported by the exerciser body. The patent is further said to disclose that through suitable linkages, motion may be imparted to the carriage or resistance exerted against its motion by manual action, by a spring or by a motor, and that the linkage may provide for adjustment of mechanical advantage or range of motion through selection of slots or holes formed in parts of the linkage structure.

Another example is taught in U.S. Pat. No. 9,220,653, issued to Israel, "Method and device for improving temporomandibular joint range of motion and strengthening/massaging jaw muscles," and is said to disclose a therapeutic exercising device that can simultaneously increase temporomandibular joint range of motion and strengthen jaw muscles, including two bite members with bite portions for insertion between a user's teeth and a bellows between the bite members that moves them relative to each other toward an open position that separates the user's upper and lower jaws. This patent is further said to disclose that a spring exerts a predetermined opening force on the bite members, and one or more elastic members attached between the bite members exert an opposing closing force, and that a user-operated pneumatic pump introduces air under pressure into the bellows to open the bite members when the closing force is sufficient to overcome the opening force. This patent is said to disclose that the device can be used with air bladders that massage the jaw muscles, with the optional application of heat or cold, and that the device is usable with a mandible translation adapter to exercise a user's mandible in the posterior-anterior direction.

Finally, U.S. Published Patent Application No. 2007/0269761, filed by Miyama, "Assisting device for practicing lateral movement of lower jaw," is said to disclose an assisting device for practicing lateral movement of a lower jaw to move a cheek-side cusp of a lower molar to a cheek-side surface of an upper molar, where the assisting device includes an occlusion portion, which is placed in an oral cavity of a user and occluded by an upper central incisor and a lower central incisor, and a handle connected with the occlusion portion. The referenced application by Miyama is further said to disclose that the occlusion portion includes an upper tooth contact surface to be in contact with an incisal edge of the upper central incisor, and a lower tooth contact surface to be in contact with an incisal edge of the lower central incisor, where the lower tooth contact surface has a flat surface and the occlusion portion provides a space between the incisal edge of the upper central incisor and the incisal edge of the lower central incisor. The referenced application by Miyama is further said to disclose that the upper tooth contact surface and the lower tooth contact surface cover entire movement ranges of the incisal edge of the upper central incisor and the incisal edge of the lower central incisor, respectively, when the lateral movement of the lower jaw is being practiced, and that it is possible to provide an assisting device for practicing lateral movement of a lower jaw to assist a user to laterally move the lower jaw in a smooth manner.

Methods and apparatuses that address deficiencies in the prior art, including but not limited to increasing ROM and elasticity and reducing the impact and appearance of scarring on skin and musculature, are desirable.

SUMMARY OF THE INVENTION

In one embodiment, the present invention includes an intraoral tool, comprising: one or more inserts comprising at least one flat surface to ensure stability within a mouth of a patient used for a delivery of a prolonged stretch of a skin, a musculature, or both, to treat a patient's facial injury or disorder. In one aspect, the intraoral tool further comprises a tool handle or a tool mounting bracket coupled to the insert and configured to permit manipulation of the insert in a patient's mouth. In another aspect, the one or more of inserts are capable of being inflated to change either the size, shape, or size and shape of the insert. In another aspect, the intraoral tool further comprises one or more interchangeable inserts formed in the same, or substantially a similar shape as a prior insert, wherein the interchangeable inserts are larger than a prior insert in one or more graduated sizes. In another aspect, the one or more inserts are integrally coupled to the one or more inserts, are non-detachably coupled to the one or more inserts, or are detachably coupled to the one or more inserts. In another aspect, the one or more inserts are positioned in the mouth with a tool handle, mounted to an end of the tool handle. In another aspect, the tool handle is provided with a flat surface for positioning against teeth or gum of the patient for stabilizing the one or more inserts in a desired location of the patient's mouth. In another aspect, the tool handle is comprised of a material that is bendable into a shape used to position the one or more insert in the desired location of the patient's mouth, comprises an excess that can be trimmed to adjust the depth of the one or more inserts, or is elongate, paddle shaped. In another aspect, the intraoral tool comprises a tool mounting bracket capable of affixing the intraoral tool to the teeth of the patient or inside the patient's mouth. In another aspect, the tool mounting bracket is comprised of: a clamp for selectively positioning the tool mounting bracket on the teeth of the patient, is formed with upper and lower openings for gripping both the upper and lower teeth of the patient, or is a bite wing-type retainer, is configured to hold the one or more inserts substantially stationary in the patient's mouth, or is at least partially adhered to the teeth with an adhesive. In another aspect, the one or more inserts are shaped to treat an injury or disorder affects at least one of a cheek, a nasolabial fold, a lip, a mentolabial junction, or a modiolus. In another aspect, the one or more inserts comprise a shape, or cross-section thereof, of a a partial disk, a cylinder, an L shape, a rectangle, a triangle, a trapezoid, a polygon, a rhomboid, a polyhedron, an oval, or a crescent of which can be flat, convex or concave given the plurality of sides. In another aspect, a surface of the tool handle or the tool mounting bracket is substantially flat, convex, concave, or has teeth, indentations, or ridges, or a plurality of teeth that locks the tool handle into the one or more inserts or the tool mounting bracket. In another aspect, the one or more inserts are solid, inflatable, or pliable. In another aspect, the intraoral tool is configured to at least one of: deliver a prolonged passive stretch treatment to the patient; deliver at least range of motion treatment to the improve a range of motion of the patient; or reduce an impact of scar tissue or to reduce an appearance of scar tissue. In another aspect, the one or more inserts are configured to treat at least one of a levator labii superioris, levator labii superioris alaeque nasi, buccinator, depressor anguli oris, mentalis, zygomaticus major, zygomaticus minor, nasalis, levator anguli oris, depressor septi, risorus, depressor labii inferioris, or orbicularis oris.

In another embodiment, the present invention includes a method of intraoral treatment of a patient, comprising: providing an intraoral tool comprising one or more inserts connected to a tool handle or a tool mounting bracket, wherein the one or more inserts are selected to provide an intraoral treatment of a facial injury or disorder, wherein the intraoral tool is configured to permit manipulation of the one or more inserts in a patient's mouth; and delivering one or more treatments to the patient to treat the facial injury or disorder. In one aspect, the injury or disorder affects at least one of a cheek, a nasolabial fold, a lip, a mentolabial junction, or a modiolus. In another aspect, the method further comprises using a elongate, paddle shape tool handle or tool mounting bracket to couple to the one or more inserts to couple to one or more teeth of the patient, wherein the tool mounting bracket is configured to hold the insert substantially stationary in the patient's mouth. In another aspect, the tool mounting bracket is integrally coupled to the insert, non-detachably coupled to the insert, or detachably coupled to the insert. In another aspect, the method further comprises bending the tool handle into a plurality of shapes, adjusting the length of the handle, has a plurality of teeth for ratcheting into the tool mounting bracket, or trimming an excess of the tool handle once the length has been adjusted. In another aspect, the at least one of the shapes is capable of holding the intraoral tool in a substantially stationary position with the insert or tool mounting bracket in the patient's mouth. In another aspect, the shape of the one or more inserts or tool mounting brackets has the shape or cross-section of a disk, a partial disk, a cylinder, an L shape, U shape, a rectangle, a triangle, a trapezoid, a polygon, a rhomboid, a polyhedron, an oval, a crescent. In another aspect, a surface of the one or more inserts, the tool handle or the tool mounting bracket is substantially flat, convex, concave, or has teeth, indentations, or ridges. In another aspect, the one or more inserts, the tool handle, or the tool mounting bracket has a substantially flat back surface, a convex front surface, ridges, teeth, indentations, or a zip level and an opening for locking the handle into the insert or mounting clamp, the insert comprises one or more pliable materials, or the one or more pliable materials include silicone or plastic. In another aspect, the one or more inserts are inflatable. In another aspect, the tool handle is at least one of: integrally coupled to the insert, non-detachably coupled to the insert, or detachably coupled to the insert. In another aspect, the one or more treatments include passive stretch treatment or range of motion treatment. In another aspect, the method further comprises providing one or more treatments to increase range of motion, reduce an impact of scar tissue, or reduce an appearance of scar tissue. In another aspect, the method further comprises using the intraoral tool is treat at least one of: a levator labii superioris, levator labii superioris alaeque nasi, buccinator, depressor anguli oris, mentalis, zygomaticus major, zygomaticus minor, nasalis, levator anguli oris, depressor septi, risorus, depressor labii inferioris, or orbicularis oris, by inserting or manipulating one or more inserts, tool handles or tool mounting brackets. In another aspect, the method further comprises optimizing a size and shape of one or more inserts or mounting clamps alone or connected to one or more one or more inserts or mounting clamps and performing one or more manipulations of the intraoral tool for treating at least one of: a levator labii superioris, levator labii superioris alaeque nasi, buccinator, depressor anguli oris, mentalis, zygomaticus major, zygomaticus minor, nasalis, levator anguli oris, depressor septi, risorus, depressor labii inferioris, or orbicularis oris through the provision of a prolonged low load stretch of the musculature.

In another embodiment, the present invention includes a kit, comprising: one or more inserts or tool mounting brackets configured for a delivery of intraoral treatment of a patient's facial injury or disorder; and one or more tool handles configured to couple to one of the one or more inserts to form an intraoral tool configured to permit movement of one of the one or more inserts in the patient's mouth to treat an injury or disorder affects at least one of a cheek, a nasolabial fold, a lip, a mentolabial junction, or a modiolus. In one aspect, the intraoral tool is configured provide a low load prolonged stretch to treat at least one of a levator labii superioris, levator labii superioris alaeque nasi, buccinator, depressor anguli oris, mentalis, zygomaticus major, zygomaticus minor, nasalis, levator anguli oris, depressor septi, risorus, depressor labii inferioris, or orbicularis oris. In another aspect, the intraoral tools are grouped by insert size and shape to provide optimal low load prolonged stretch to facial muscles. In another aspect, the one or more inserts are attached to a handle or intraoral mouth bracket based on defined criteria for optimal benefit based on patient needs. In another aspect, the one or more inserts are packaged as solid versus inflatable based on patient needs for prescriptive dosing of the insert size and shape.

In addition to the foregoing, various other method, system, and apparatus aspects are set forth in the teachings of the present disclosure, such as the claims, text, and drawings forming a part of the present disclosure.

The foregoing is a summary and thus contains, by necessity, simplifications, generalizations, and omissions of detail. Consequently, those skilled in the art will appreciate that this summary is illustrative only and is not intended to be in any way limiting. Other aspects, features, and advantages of the devices, processes, and other subject matter described herein will be become apparent in the teachings set forth herein.

BRIEF DESCRIPTION OF THE DRAWINGS

For a more complete understanding of the features and advantages of the present invention, reference is now made to the detailed description of the invention along with the accompanying figures, in which.

DETAILED DESCRIPTION OF THE INVENTION

Figure 1A:
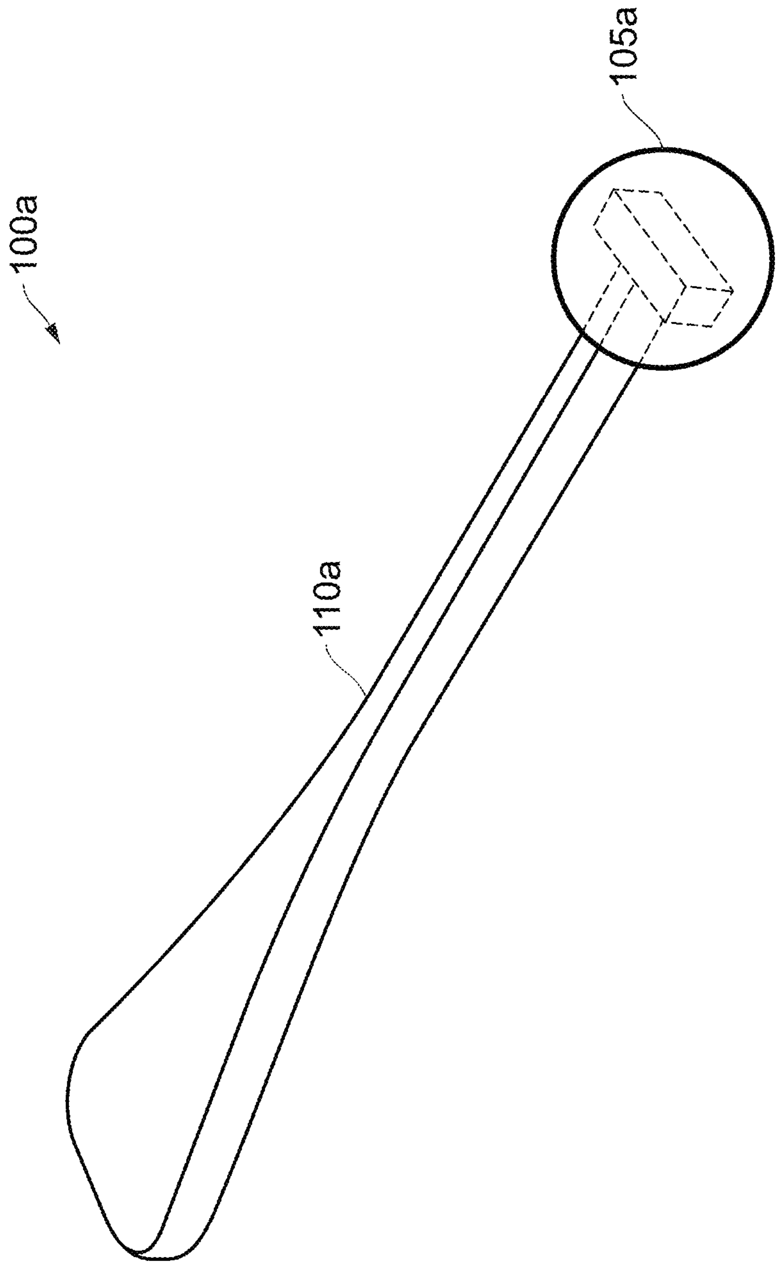
FIGS. 1A, 1B, 1C, 1D, 1E, 1F, 1G, and 1H show perspective views of exemplary intraoral tools according to the present invention.

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The present invention addresses various facial injuries and disorders. For example, as a result of continued challenges in the treatment of facial burn victims, the inventors of the present invention have tried several unconventional methods for orofacial stretching, including the development of the present invention, including intraoral devices that deliver a passive stretch to multiple sites, thereby increasing range of motion and elasticity and directly impacting both skin and musculature.

The present invention is designed to deliver a low load prolonged passive stretch to scarred or contracted orofacial musculature, with the goals of increasing range of motion for multiple facial muscles and tissues and reducing the impact and appearance of scar tissue. The present invention directly targets multiple sites across the face, with particular attention to the cheeks, nasolabial folds, upper lip, mentolabial junction, and modiolus, achieving a stretch that currently available tools cannot provide.

Another expected gain is the improved ability to produce different facial expression, which is also often negatively impacted by facial burns. The present invention can be used with neonates, children, and adults and may be used by speech pathologists, therapists, caregivers, and patients.

Broadly, the present invention includes an apparatus and method for applying low load, prolonged stretch to the skin and facial musculature of a patient comprising: one or more inserts for positioning in the oral cavity of the patient, in which the one or more inserts comprise a flat, back surface for orienting towards the midline of the patient when the insert is positioned in the desired location in the oral cavity, and a front surface having a three-dimensional shape for orienting away from the midline of the patient when the insert is positioned in the desired location in the oral cavity of the patient. The insert can include different sizes, different shapes, or both different sizes and different shapes. The invention can also include a tool for positioning the one or more inserts in the oral cavity of the patient, wherein the tool comprises a portion that couples the insert to the tool and structure for use to insert and hold the one or more inserts in the desired location in the oral cavity of the patient with the flat back surface of the insert stabilized against the teeth or gums of the patient. Low load is the amount of force necessary to conform the insert about the facial burns and to deliver one or more treatment to muscle groups in or about the mouth of the patient.

As used herein, the terms "positive stretch" or "prolonged stretch" refer generally to holding a muscle or group of muscles in a lengthened position by an external source or device for a period of time. The period of time can be from 1 to 120 minutes, 3 to 90 minutes, 5 to 60 minutes, 7 to 50 minutes, 8 to 45 minutes, 9 to 35 minutes, 10 to 30 minutes, 11 to 25 minutes, 12 to 20 minutes, 5 to 20 minutes, 5 to 30 minutes, 5 to 40 minutes, 1, 2, 3, 4, 5, 6, 7, 8, 9, 10, 11, 12, 13, 14, 15, 20, 25, 30, 30, 35, 40, 45, 50, 55, or 60 minutes, and/or increments of 5 minutes, plus or minus 10%. The specific length of time will depend on the specific injuries of the patient, the muscle or group of muscles lengthened, the number of treatments involved, and the extent of the final lengthening and treatment required.

Figure 1B:
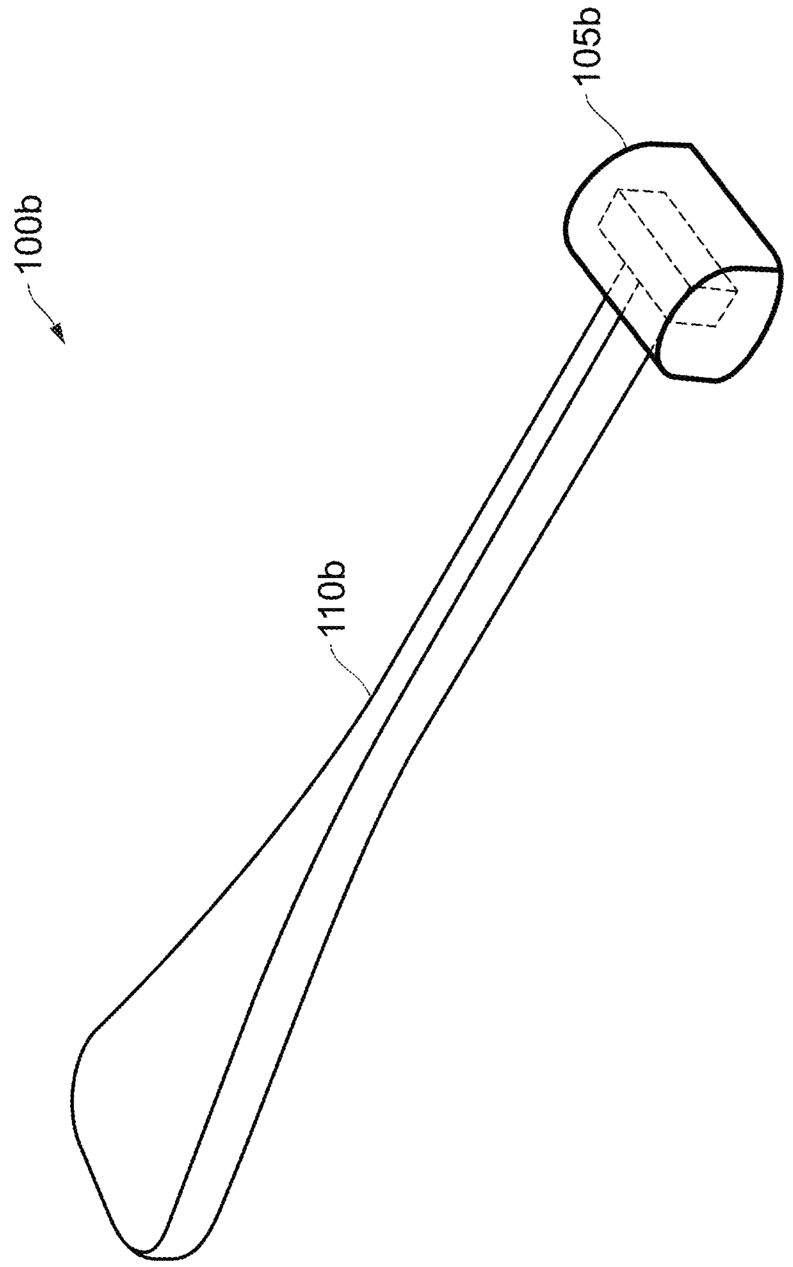
Figure 1C:
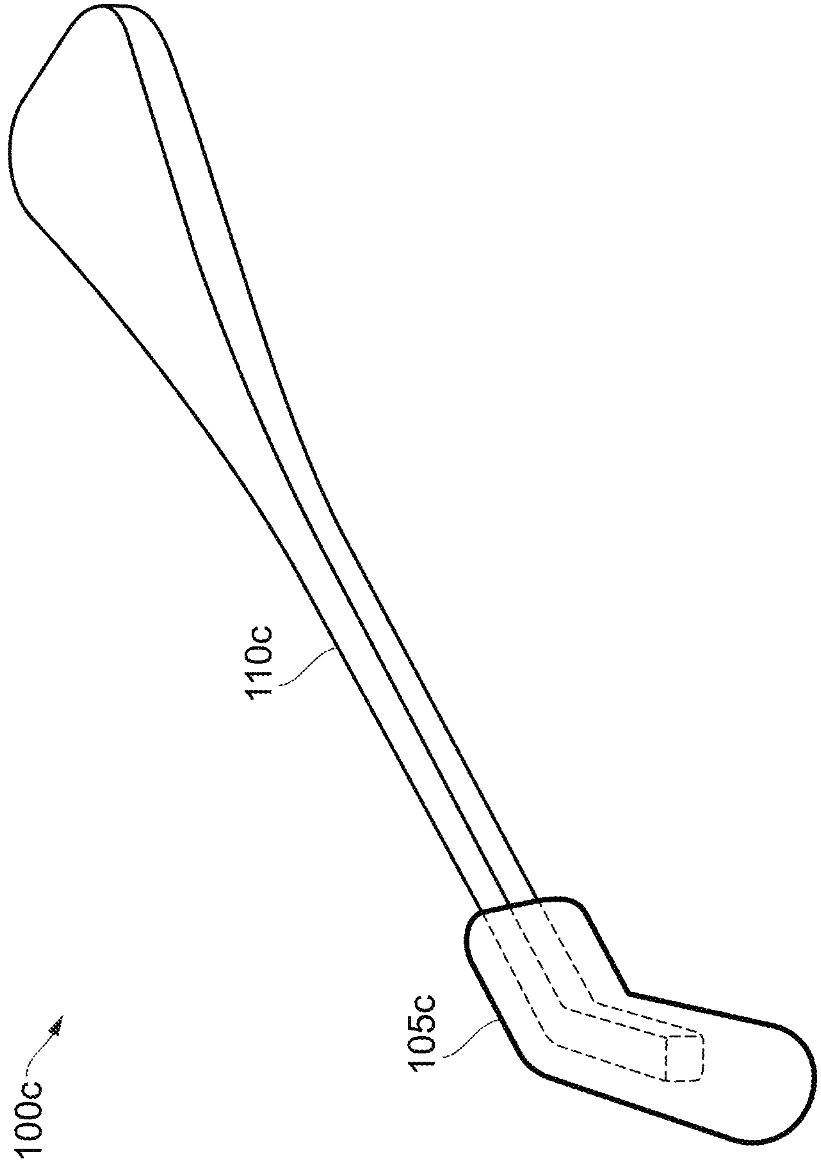
Figure 1D:
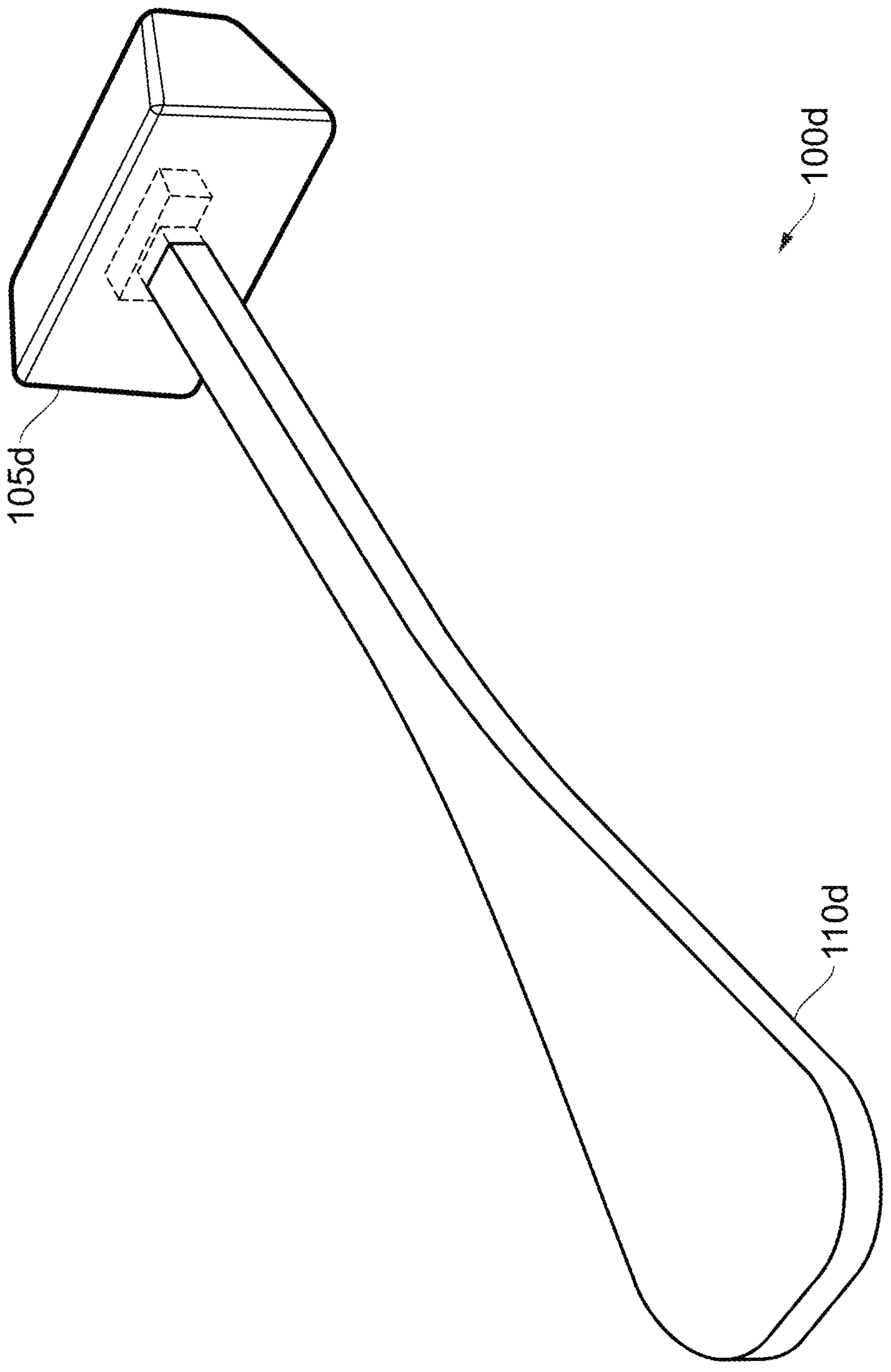
Figure 1E:
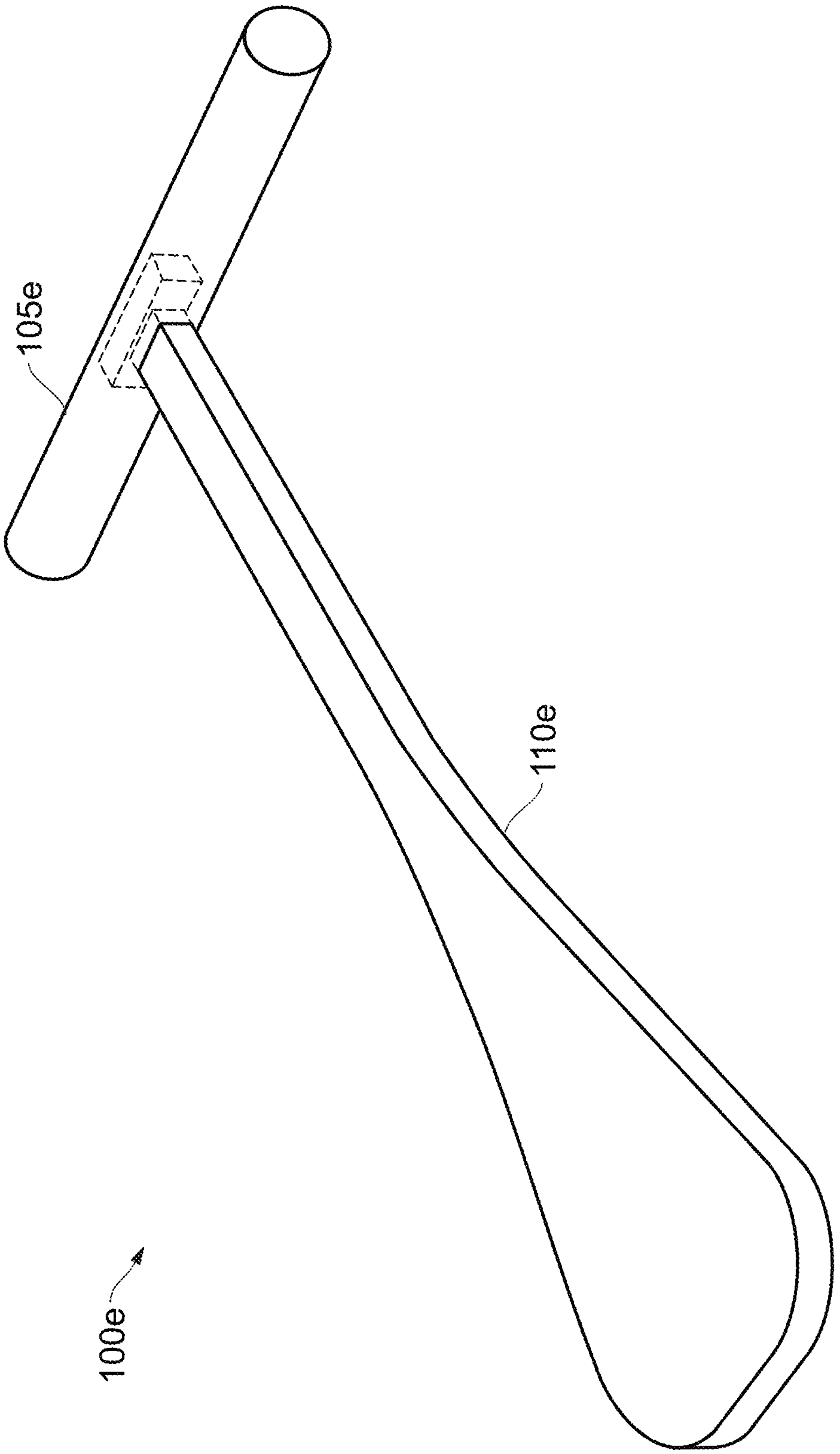
Figure 1F:
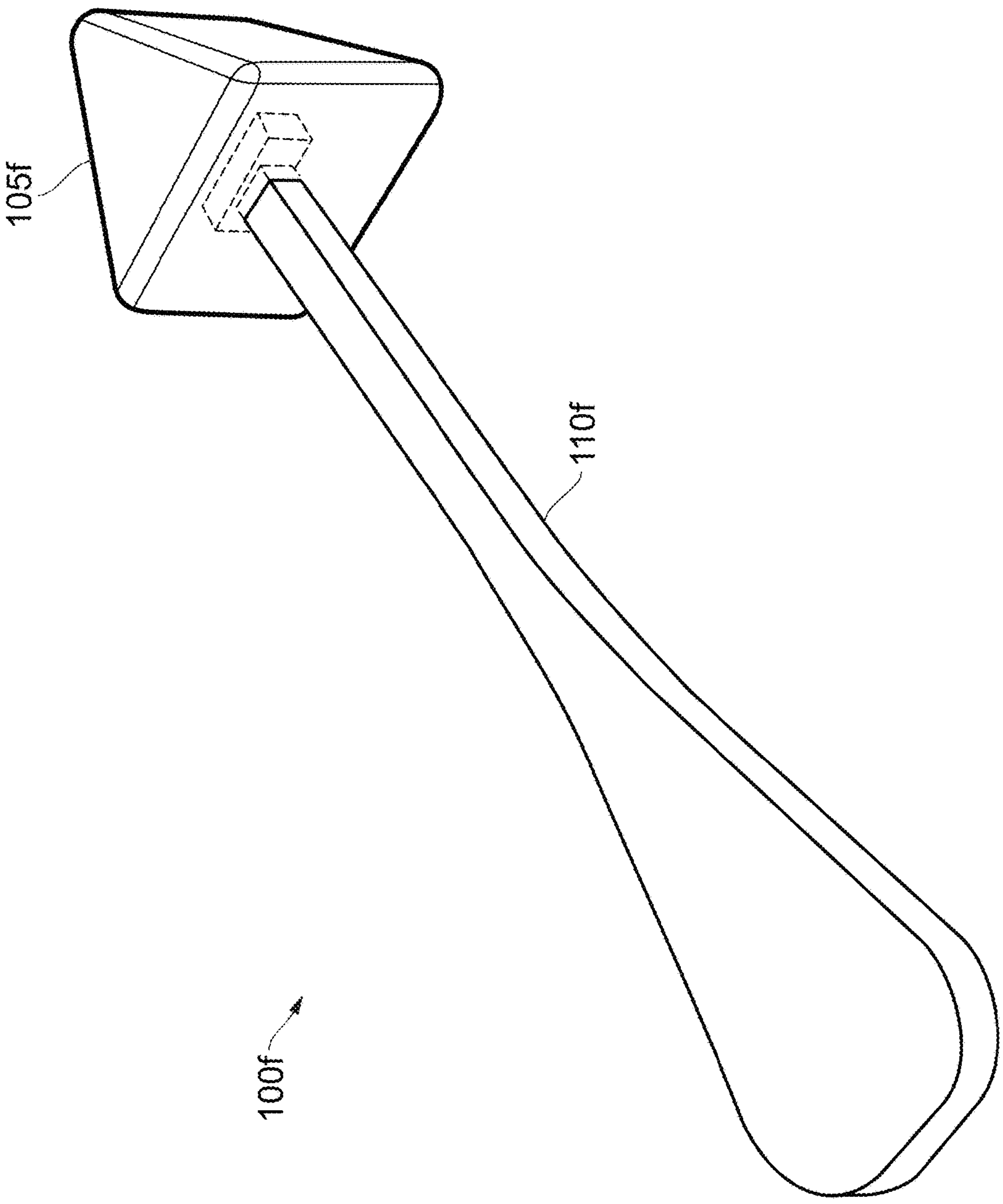

FIGS. 1A, 1B, 1C, 1D, 1E, and 1F show perspective views of exemplary intraoral tools according to embodiments of the present invention. Each exemplary intraoral tool 100*a*, 100*b*, 100*c*, 100*d*, 100*e*, and 100*f* includes an insert 105*a*, 105*b*, 105*c*, 105*d*, 105*e*, and 105*f*, respectively. Each exemplary intraoral tool 100*a*, 100*b*, 100*c*, 100*d*, 100*e*, and 100*f* also includes a handle 110*a*, 110*b*, 110*c*, 110*d*, 110*e*, and 110*f*, respectively. Each of the inserts 105 is shaped and sized to enable delivery of treatment to patients with facial burns. Each of the handles 110 is configured to enable manual manipulation of an insert 105 within a patient's mouth to deliver treatment. FIG. 1A shows intraoral tool 100*a* with disk-shaped insert 105*a* and handle 110*a*. FIG. 1B illustrates intraoral tool 100*b* with insert 105*b* with a rectangular cross-section and handle 110*b*. FIG. 1C depicts intraoral tool 100*c* with L-shaped insert 105*c* and handle 110*c*. FIG. 1D shows intraoral tool 100*d* with insert 105*d*, which has a trapezoidal cross-section, and handle 110*d*. FIG. 1E shows intraoral tool 100*e* with insert 105*e*, which has a cylindrical shape with rounded ends, and handle 110*e*. FIG. 1F depicts intraoral tool 100*f* with insert 105*f*, which has a triangular cross-section, and handle 110*f*. An insert 105 and a handle 110 may be integrally coupled, non-detachably coupled, or detachably coupled to form an intraoral tool 100. The inserts illustrated in FIGS. 1A through 1F are exemplary. In embodiments of the present invention, inserts 105 may have the shape or cross-section of a disk, a partial disk, a cylinder, an L, a rectangle, a triangle, a trapezoid, a polygon, a rhomboid, a polyhedron, an oval, a crescent, or some other shape or cross-section not specified herein. A surface of an insert 105 may be substantially flat, convex, or concave. An insert 105 may comprise one or more pliable materials, such as silicone or plastic. An insert 105 may be inflatable.

Figure 1G:
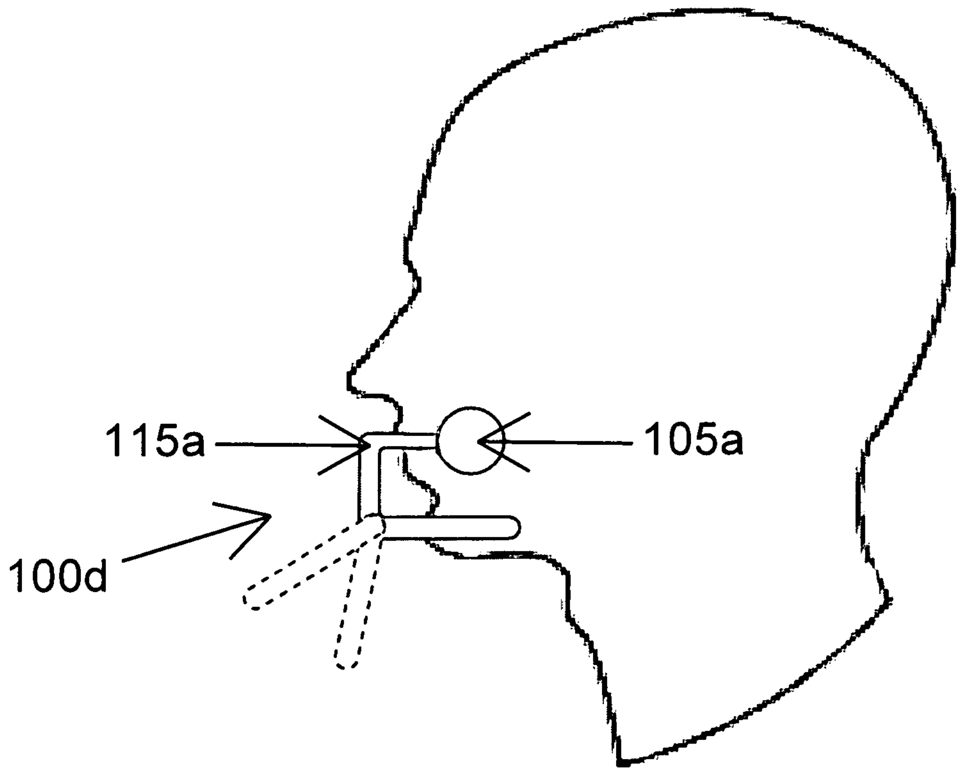

FIG. 1G shows an embodiment of intraoral tool 100*a*, including insert 105*a* and bendable handle 115*a*. While an embodiment of intraoral tool 100*a* is illustrated, any intraoral tool 100 may include a bendable handle 115 which may be integrally, non-detachably, or detachably coupled to an insert 105 or to a handle 110. The bendable handle 115, such as bendable handle 115*a*, may be configured to be bent into a particular shape and to retain that shape until bent into another shape. The bendable handle 115 may be bent into a shape that will hold an insert 105 in a position and orientation suitable for effective delivery of treatment, e.g., a shape that conforms to the patient's chin or jaw while holding the insert 105 in the patient's mouth.

Figure 1H:
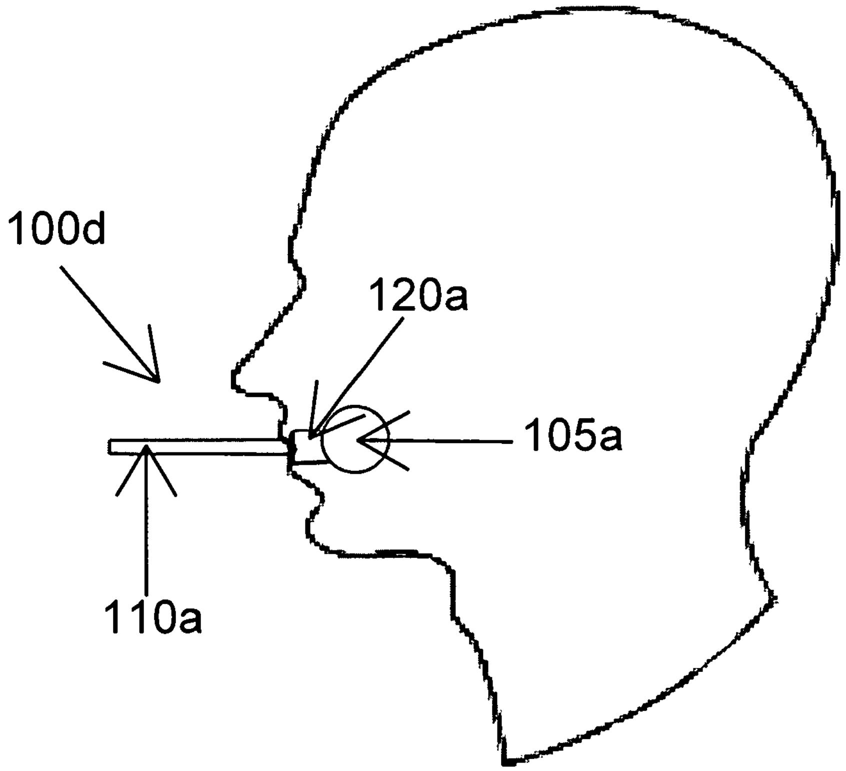

FIG. 1H shows an embodiment of intraoral tool 100*a*, including insert 105*a*, handle 110*a*, and tool mounting bracket 120*a*. While an embodiment of intraoral tool 100*a* is illustrated, any intraoral tool 100 may include a tool mounting bracket 120, which includes a tool mounting bracket 120, e.g., tool mounting bracket 120*a*, to which an insert 105, a tool handle 110, or a bendable handle 115 may be coupled, integrally, detachably, or non-detachably. The tool mounting bracket 120, such as the tool mounting bracket 120*a* shown, is configured to be held in a patient's mouth in a substantially stationary way such that an insert 105 coupled to it, such as the insert 105*a* shown, is positioned and oriented for delivery of effective treatment. Further, tool mounting bracket 120 is configured to hold a tool handle 110 or bendable handle 115 that is coupled to it in a position and orientation suitable for a person to use the tool handle to place the tool mounting bracket and the insert into a patient's mouth and to remove them from the patient's mouth.

Non-limiting exemplary intraoral tools 100*a*, 100*b*, 100*c*, 100*d*, 100*e*, and 100*f* and other intraoral tools as described herein are embodiments of the present invention for delivery of treatment of medical condition affecting the face such as facial burns, including passive stretch of scarred tissue or contracted facial musculature after surgery and burns. Use of the present invention may be used to increase range of motion (ROM) and elasticity for multiple facial muscles and tissues, and to reduce the impact and appearance of scar tissues as discussed herein. The tools may be used by therapists, caregivers, or patients as discussed herein.

Figure 2A:
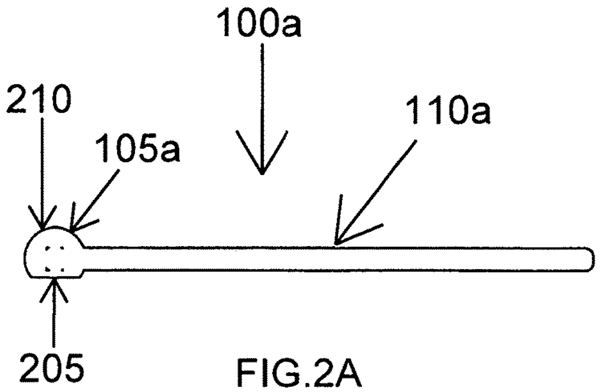
FIGS. 2A, 2B, and 2C show cross-sections of exemplary inserts according to the present invention.
Figure 2B:
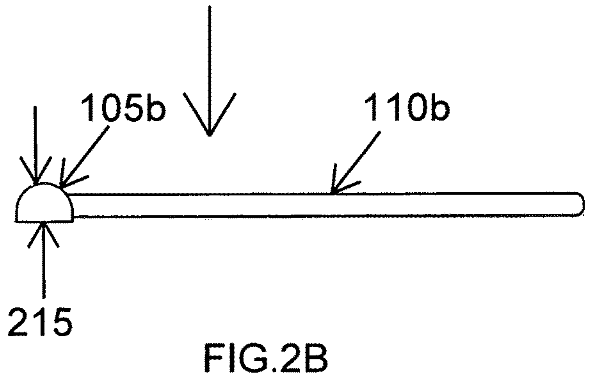
Figure 2C:
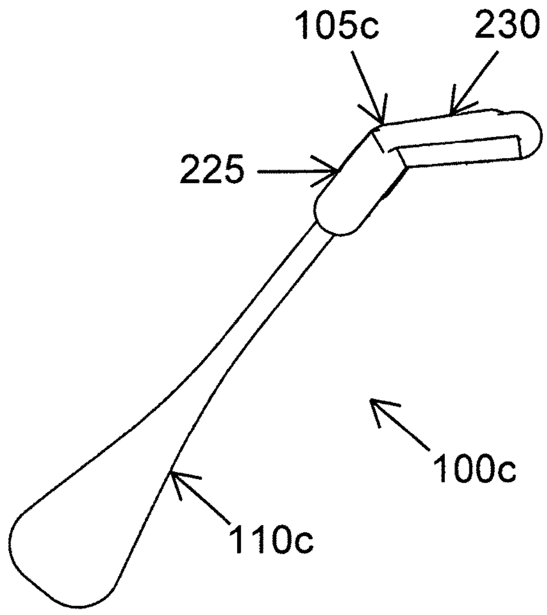

FIGS. 2A, 2B, and 2C show cross-sections of exemplary inserts and tool handles according to the present invention. FIG. 2A shows disk-shaped insert 105*a* and tool handle 110*a*, FIG. 2B shows an insert 105*b* with a rectangular insert and tool handle 110*b*, and FIG. 2C shows L-shaped insert 105*c* and tool handle 110*c*. Each of the inserts shown, inserts 105*a*, 105*b*, 105*c* and other inserts not shown but that are within the scope of the present invention, are shaped to deliver treatment to patients with facial injuries or disorders including but not limited to facial burns, hypertonic facial muscles, cerebral palsy, lip contractures following cleft lip surgery, and patients with oral motor deficits. Each insert 105 may be shaped appropriately for delivery of treatment, and insert shapes are not limited by the shapes disclosed herein. Each insert 105 may be sized appropriately for the sizes of the differently-sized patients' mouths, including neonates, pediatrics, and adults, for patients of different sizes and different particular needs within each of those groups.

Referring now to FIG. 2A, in an embodiment of the present invention, a disk-shaped insert such as disk-shaped insert 105*a* may be 5 mm in diameter for neonates, 14 mm in diameter for pediatrics, and 17 mm in diameter for adults, and generally ranging from 5 mm to 50 mm in diameter, among possible diameters. While this figure shows one shape, any of the inserts shown in any of the figures of the present invention may range from 2 mm to 50 mm in thickness, among possible thicknesses, but can also be 3 mm, 4 mm, 5 mm, 6 mm, 7 mm, 8 mm, 9 mm, 10 mm, 15 mm, 20 mm, 25 mm, 30 mm, 35 mm, 40 mm, or 45 mm, and may have any of the wide variety of shapes shown herein, in addition to other shapes, such as custom fit shapes that can be, e.g., 3D printed. The various embodiments of the inserts of the present invention may also have sizes outside these specified ranges for use with patients with specific treatment requirements for any of the examples and figures in the present specification.

A disk-shaped insert such as 105*a* has a substantially flat back surface 205 which is positioned anterior to dentition or the gum line and orienting toward the midline of the patient when placed in a patient's mouth to assist with securing placement in the mouth, and a convex or three dimensional front surface 210 for orienting away from the midline of the patient and providing the desired stretch. Placement of disk-shaped insert 105*a* or a similarly configured insert underneath the upper lip and superior to the nostril targets at least the levator labii, levator labii superioris alaeque nasi, and levator labii superioris muscles and may allow for a secondary gain of impact to the transverse nasalis muscle. Placement of disk-shaped insert 105*a* or a similarly configured insert underneath the upper lip at the nasolabial fold, near the nostril, targets at least the levator anguli oris and levator labii superioris muscles and may possibly impact the zygomaticus minor muscle. Placement of disk-shaped insert 105*a* or a similarly configured insert underneath the lower lip near the corner of the lip targets at least the depressor anguli oris and the depressor labii inferioris muscles and may impact the risorius muscle, the buccinators muscles, and the orbicularis oris muscle.

Referring now to FIG. 2B, a rectangular insert such as rectangular insert 105*b* may be 16 mm×6 mm for neonates, 24 mm×9 mm for pediatrics, and 28 mm×11 mm for adults, and may range from 8 mm to 28 mm in its long dimension, with proportionate short dimensions, among possible dimensions. Such a rectangular insert may range from 5 mm to 15 mm in thickness among possible thicknesses. Embodiments may have sizes outside these specified ranges for use with patients with specific treatment requirements.

A rectangular insert such as rectangular insert 105*b* has a substantially flat back surface which is positioned anterior to dentition when placed in a patient's mouth to assist with securing placement in the mouth and a convex front surface 220 which is convex and three dimensional anterior surface to provide the stretch of the skin and musculature as it orients away from the midline of the patient. Placement of rectangular insert 105*b* or a similarly configured insert underneath the upper lip targets the orbicularis oris muscle and depressor septi muscle. Placement of rectangular insert 105*b* or a similarly configured insert underneath the lower lip targets at least the obscularis oris, mentalis, and depressor labii inferioris muscles.

Referring now to FIG. 2C, an L-shaped insert such as L-shaped insert 105*c* may be 32 mm×8 mm for neonates, 42 mm×10 mm for pediatrics, and 45 mm×13 mm for adults, among possible dimensions. Such an L-shaped insert may range from 25 mm to 50 mm in its long dimension, and varies as required in its short dimension, among possible dimensions, and may range from 2 mm to 50 mm in thickness, among possible thicknesses, typically in 1 to 5 mm increments. Embodiments may have sizes outside these specified ranges for use with patients with specific treatment requirements.

An L-shaped insert such as L-shaped insert 105*c* has a shorter leg 225 nearer the handle 110*c*, and the longer leg 230 is configured to run parallel to the maxilla and mandible. The shape of L-shaped insert 105*c* enables a comfortable fit within the mouth while achieving a stretch of both skin and musculature via a deeper placement within the mouth. Placement of L-shaped insert 105*c* or a similarly configured insert will target at least the zygomaticus major, risorius, depressor anguli oris, and buccinator muscles.

Figure 3:
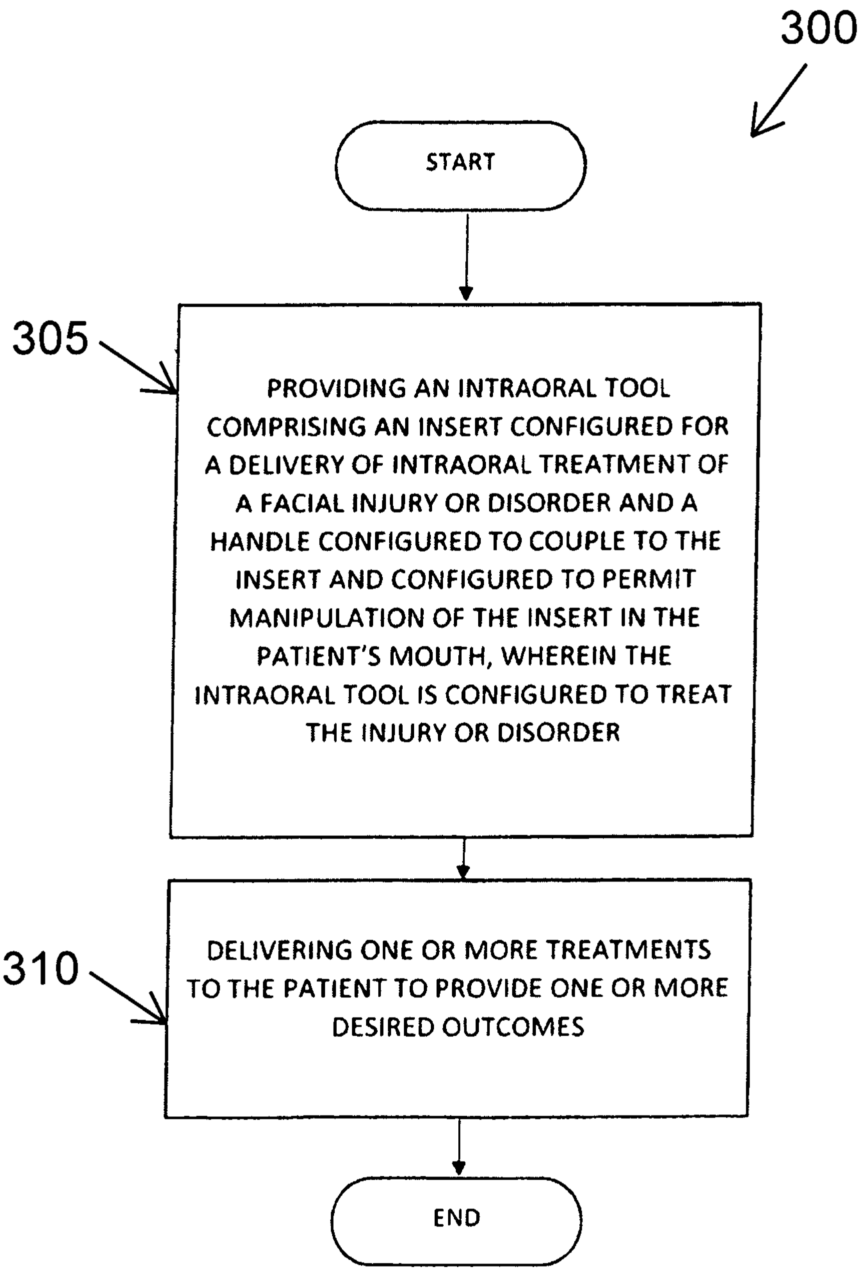
FIG. 3 illustrates a method of treatment according to the present invention.

FIG. 3 illustrates a method of treatment according to an embodiment of the present invention. Method 300 includes block 305, providing an intraoral tool 100 comprising an insert, such as one of insert 105*a*, 105*b*, or 105*c*, configured for a delivery of intraoral treatment of a facial injury or disorder and a handle, such as handle 110*a*, 110*b*, or 110*c*, configured to couple to the insert and configured to permit manipulation of the insert in the patient's mouth, wherein the intraoral tool is configured to treat the injury or disorder. Method 300 also includes block 310, delivering one or more treatments to the patient to provide one or more desired outcomes.

The present invention may also be used in the treatment of patients with hypertonic facial muscles, cerebral palsy, lip contractures following cleft lip surgery, and patients with oral motor deficits.

To gather pre- and post-use data and measurements for orofacial movements and function, along with development of a potential prescriptive rehabilitative plan for orofacial scar management, the inventors of the present invention will study use of embodiments of the present invention. The need for early intervention in facial scar management was documented in Parry et al. [6] and Clayton et al. [1] A focus of the investigation would be on the early use of the present invention as a method for preserving and increasing range of motion and elasticity. Proposed data points are adapted from the study completed by Hadlock and Urban [7], in which they assessed resting facial distance relationships and changes in these relationships during movements to form different facial expressions using a device called Facial Assessment by Computer Evaluation (FACE). Those skilled in the art who have the benefit of this disclosure will recognize that in one embodiment, a software program such as is available commercially and/or that is written for this specific purpose is used to measure orofacial movements and changes in range of motion and that the data resulting from the use of such software program(s) is then utilized to direct the continued treatment of the patient by, for instance, using a larger diameter insert for applying a further degree of stretch to address, for instance, reduced range of motion due to a lip contracture. A customized software program to measure orofacial movements and changes in range of motion can be used with the present invention.

Medical grade silicone, similar to the Rebound® 25 Smooth On, may be used to create distinct shapes in neonate, pediatric, and adult sizes, as described herein. One or more handles or mounting brackets are made to allow for manipulation of the device and to prevent choking risks. All intraoral tools will be hand-washable. Each intraoral tool will be used for one patient only.

The following is an example of the uses and methods of using the present invention. Adult burn patients are recruited for an 8 week clinical trial. During the 8 week clinical trial, the patients attend a weekly session with the inventors of the present invention or their staff members, complete the prescriptive program, have no surgeries for skin grafting or oral commissure release, and not use pressure garments.

An initial assessment of the patient is conducted, the appropriate tool or tools are selected, the patient or a caregiver or both is trained in the use of the tool(s) until they can demonstrate independent carryover of the placement and verbal confirmation for the protocol prescribed. The data to be gathered includes pupil distance, vertical range of motion, horizontal range of motion, and facial measurements at rest and while completing specific facial movements, with the goal of demonstrating increased range of motion of the oral musculature and improved facial scar appearance over time.

In one non-limiting example of a treatment, an insert is selected for use in a 60 minute intervention 2 times per day for each day of the study. Frequency of use of the device is closely documented by the patient or caregiver using a charting system. Because use of the devices would be prescriptive, the applicable insert(s) and placement(s) vary by individual and by week. Specifically, placement(s) is (are) expected to vary each week based on the clinical needs of the subject and outcomes seen from the prior week's intervention. Data is gathered at the initial assessment and 1 time per week thereafter for the duration of the 8 week trial. As a result, data is evaluated as to the prescriptive plan for deficits for specific facial landmarks and their associated muscle groups (cheeks, nasolabial folds, upper lip, mentolabial junction and modiolus). A cranial nerve assessment is made at the initial and final assessments.

Photographs of the front and sides of the patients' faces are taken weekly, and measurements are taken from the photographs at these specific points: pupil distance; horizontal distance between outside of nares; pupil to outside of nares (right and left); pupil to outside corner of lip (right and left); superior edge of philtrum to outside corner of lip (right and left); length of philtrum; superior border of upper lip to inferior border of lower lip; horizontal distance between outside corners of lips; and inferior border of lower lip to inferior tip of chin. Measurements are taken during each of these targeted facial expressions: at rest; wrinkle the nose; gentle smile; broad smile with lips closed as well as teeth together; vocalizing prolonged "eee" sound; vocalized prolonged "000" sound; lip pucker; and mouth opening as measured by distance between inferior upper lip and superior lower lip.

The facial muscles to be targeted include: the levator labii superioris (elevates the upper lip and deepens the nasolabial furrow); buccinator (controls movement of the cheeks and assist sucking in neonates and mastication in pediatrics and adults); depressor anguli oris (assists with frowning, pulls corners of mouth inferiorly); mentalis (protrudes lower lip, inward and upward movement of the soft tissue of the chin); zygomaticus major (pulls angle of mouth upward and laterally); zygomaticus minor (raises upper lip); nasalis (compress bridge, depresses tip of nose, elevates corners of nostrils); levator anguli oris (assists with smiling, elevates angle of the mouth); depressor septi (depression of the nasal septum); risorius (draws back the angle of the mouth laterally); depressor labii inferioris (depression of the lower lip); and orbicularis oris (sphincter around the mouth, brings lips together, retracts lower lip). See Marur et al. [8].

Figure 4A:
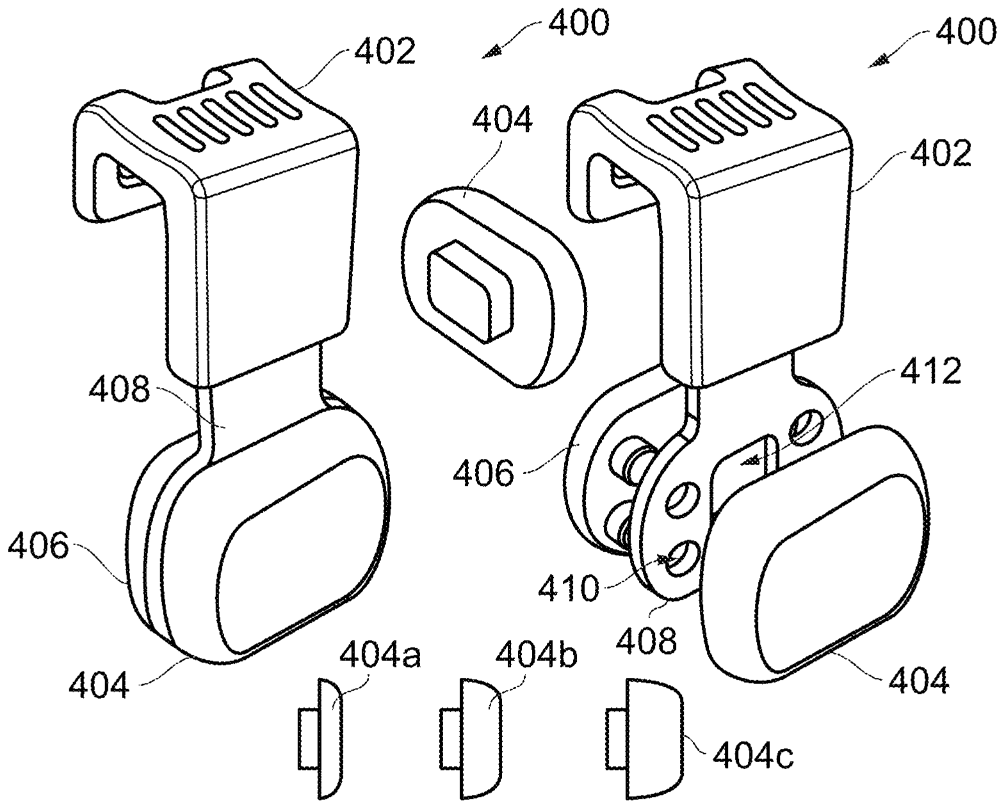
FIGS. 4A to 4E show the use of silicon rubber inserts of variable sizes which may be comprised of an inflatable pouch in order to change the degree of thickness of the distal end of the intraoral device?.
Figure 4B:
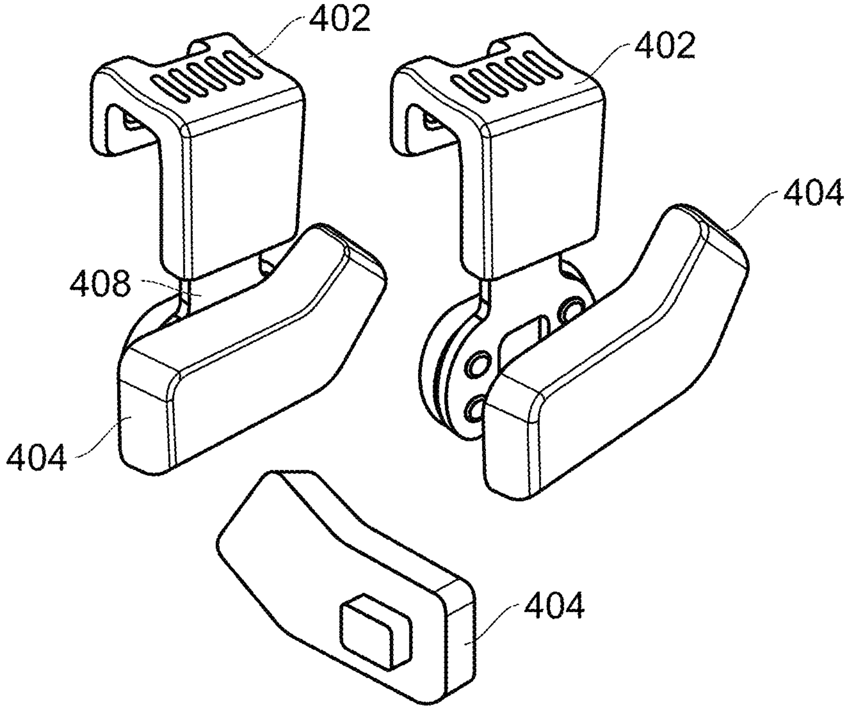
Figure 4C:
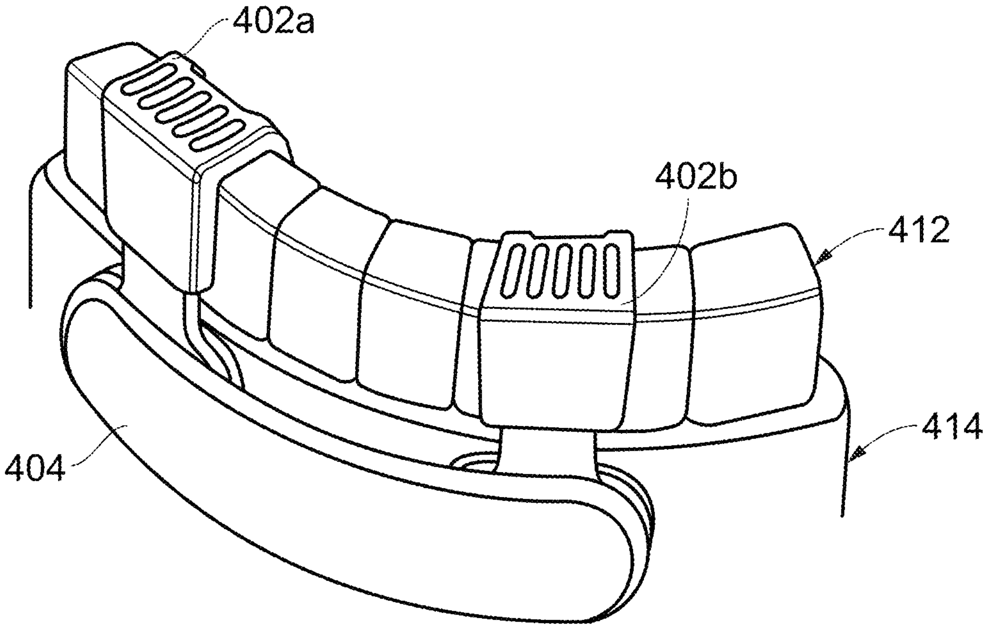
Figure 4D:
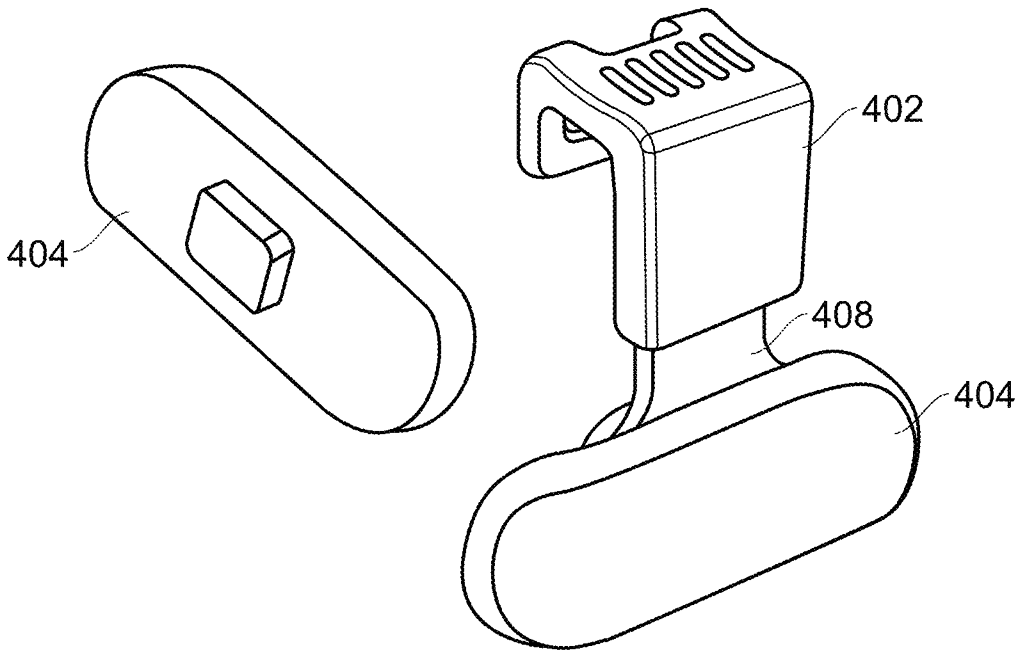
Figure 4E:
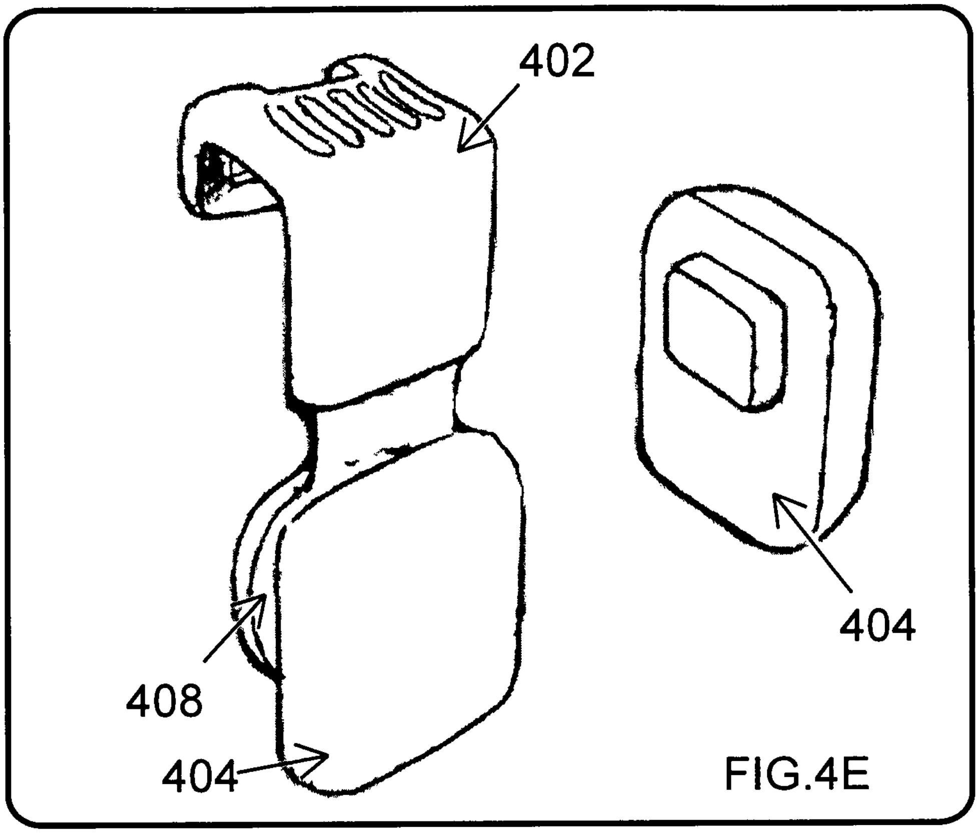

FIGS. 4A to 4E show intraoral tool 400 that use inserts that can be, e.g., resilient silicon rubber blocks, of variable sizes instead of an inflatable pouch in order to change the degree of thickness of the distal end of the intraoral tool 400 not unlike headphones provided with different sized silicone ear buds. Interchangeable inserts (side view) of various sizes are used to alter the thickness of a distal end of the intraoral tool 400, and as shown in FIG. 1H. In FIG. 4A (left and right) an intraoral tool 400 is depicted that includes a tool mounting bracket 402, a front insert 404 and a flat back insert 406, connected by a tool handle 408. The front insert 404 is depicted as having protrusion that can be inserted in openings 410 in the tool handle 408, that also serves as a frame for the intraoral tool 400. The front insert 404, the flat back insert 406, or both can be made with different thicknesses as shown using front insert 404*a*, 404*b*, and 404*c* as examples. FIG. 4B shows the intraoral tool 400 with an elongated and angled the front insert 404 that provides for increased control and/or leverage while using the intraoral tool 400. FIG. 4C shows another embodiment of the intraoral tool 400 in which the front insert 404 is depicted as being both elongated and curved and connecting two separate tool mounting brackets 402*a* and 402*b* that are shown in use with teeth 412 and gum line 414. FIG. 4D shows another embodiment of the intraoral tool 400 in which the front insert 404 is depicted as elongated on both ends. FIG. 4E shows another embodiment of the intraoral tool 400 in which the front insert 404 is depicted as being elongate along an axis that is distal from the tool mounting bracket 402.

Figure 5A:
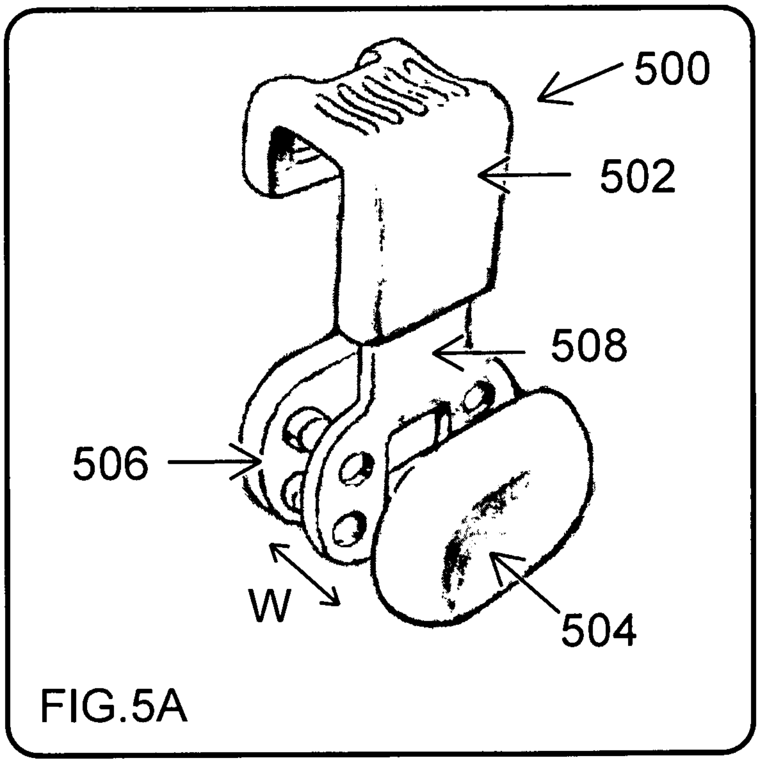
FIGS. 5A to 5C show another embodiment, in which the insert is shown attached to the tool and in which the insert is easy to mount or remove by but will not come off easily when placed in the mouth of the patient.
Figure 5B:
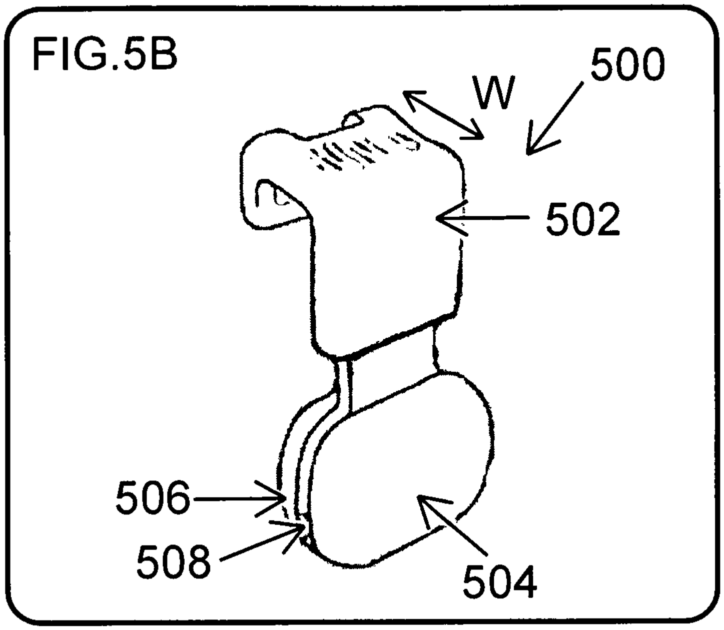
Figure 5C:
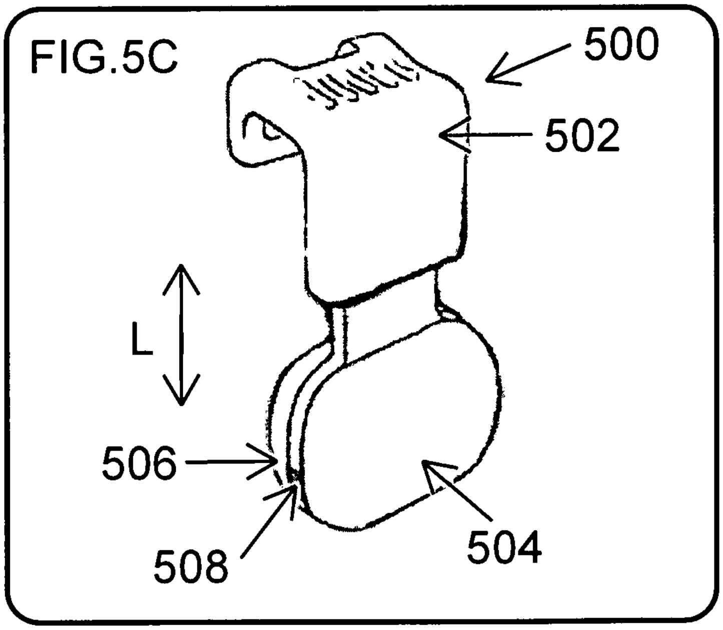

FIGS. 5A to 5C show an intraoral tool embodiment 500, which is easy to mount or remove to but resists movement in the mouth after being properly placed. Further, the intraoral tool decreases the likelihood of being dislodged thereby decreasing the likelihood of choking. The intraoral tool 500 provides a height adjustment (in some cases it may be hard as opposed to soft). In FIG. 5A show an intraoral tool 500 is depicted that includes a tool mounting bracket 502, a front insert 504 and a flat back insert 506, connected by a tool handle 508, but in this embodiment the width "W" of the front and back inserts 404, 406 is increased or decreased such that the amount of stretch provided to the patient is varied. In FIG. 5B an intraoral tool 500 is depicted that includes tool mounting bracket 502, a front insert 504 and a flat back insert 506, connected by a tool handle 508, but in this embodiment the width "W" of the tool mounting bracket 502 is varied depending on the size of the teeth of the patient. FIG. 5C shows an intraoral tool 500 that includes a tool mounting bracket 502, a front insert 504 and a flat back insert 506, connected by a tool handle 508, but in this embodiment the length "L" of the tool handle 508 can be varied. While the version in FIGS. 5A, 5B, and 5C are shown separately, intraoral tool 500 can include any two or all three of the variants at the same time. This figures shows that the front insert 504 and a flat back insert 506 can be interchanged to change the dimensions, shape, location, size, width, length, support, and/or depth of the treatment by interchanging different front insert 504 and/or flat back insert 506.

Figure 6A:
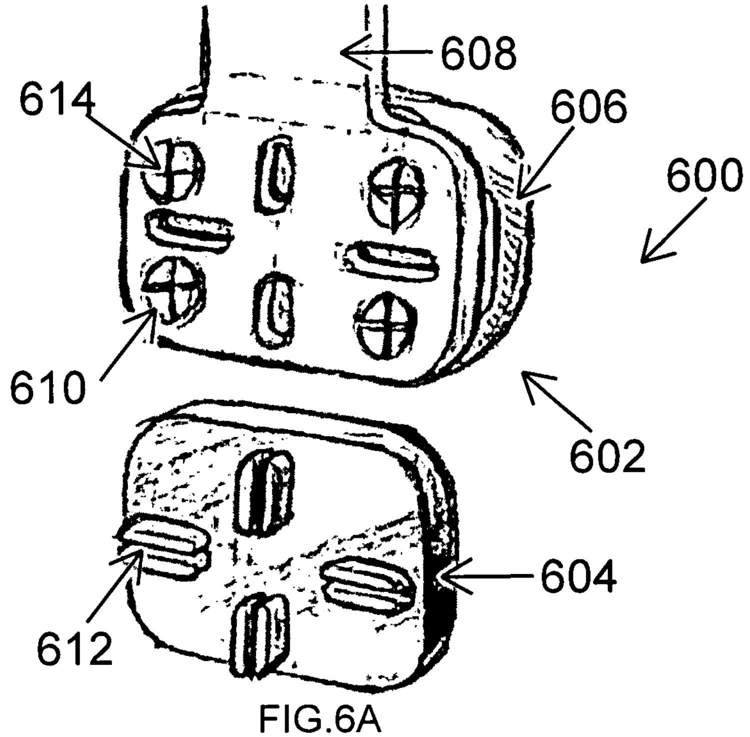
FIGS. 6A and 6B show an exploded view (FIG. 6A) and the assembled view (FIG. 6B) of an intraoral tool of the present invention.
Figure 6B:
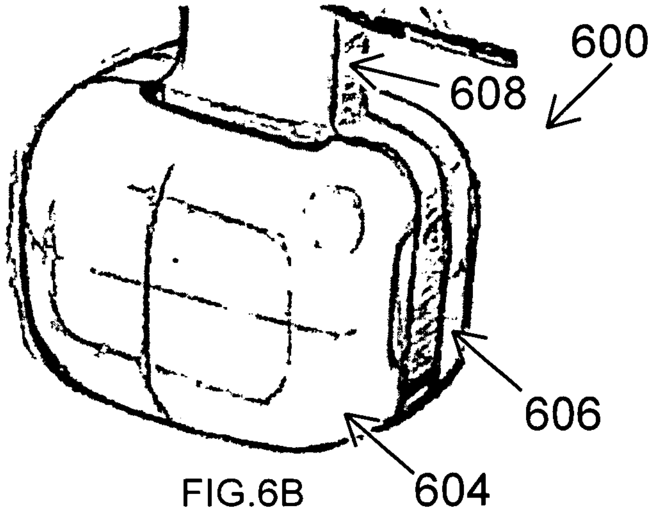

FIGS. 6A and 6B show an exploded view (FIG. 6A) and the assembled view (FIG. 6B) of a tool handle 602 of the intraoral tool 600, showing the front insert 604 and the flat back insert 606 in which the tool handle 602 is shown having multiple openings 610 into which protrusions 612, 614 enter to connect the front insert 604 and the flat back insert 606 to the frame 608.

Figure 7A:
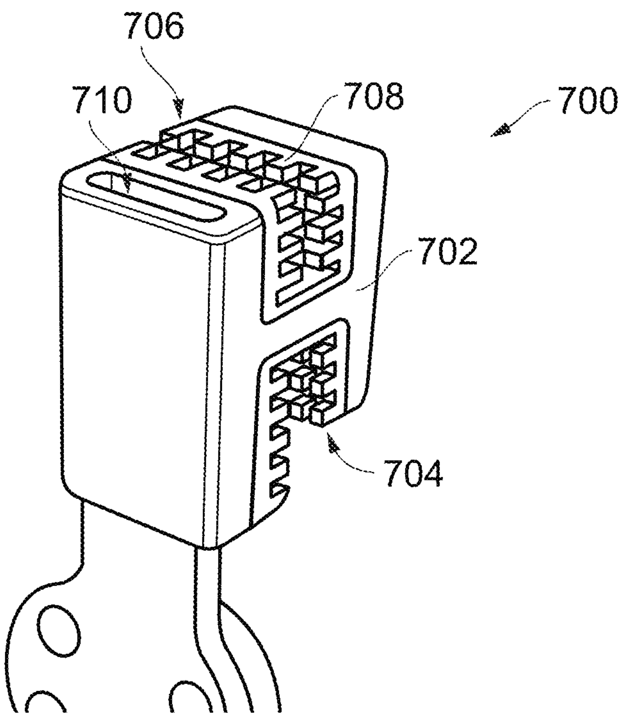
FIG. 7A shows an isometric view, and FIG. 7B a cross-sectional side view, of yet another embodiment of the intraoral tool of the present invention.
Figure 7B:
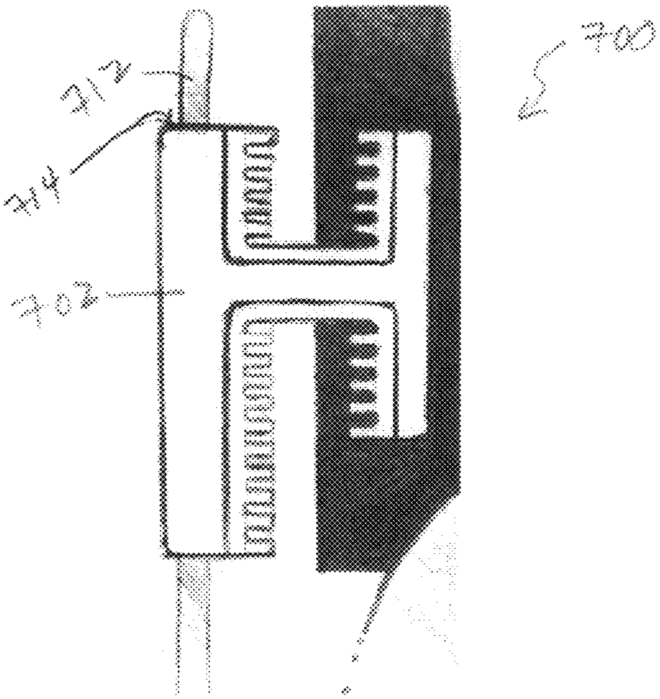
FIG. 7C shows intraoral tool in operation.

FIG. 7A shows an isometric view, and FIG. 7B a cross-sectional side view, of yet another embodiment of the intraoral tool 700 of the present invention. In this embodiment two different features are shown (which can be used alone or in combination), a variable length mechanism for the tool handle 712 and one or more grips for the tool mounting bracket 702 that include teeth. In this example, the tool mounting bracket 702 can be formed to include an upper opening 706 and lower opening 704 that each grip the patient's upper teeth and patient's lower teeth (not depicted), respectively, at the same time.

A plurality of teeth 708 in either the upper and lower openings 704, 706, or both, of the tool mounting bracket 702 will typically be made from a resilient material (such a plastic or silicone) grip the teeth.

Figure 7C:
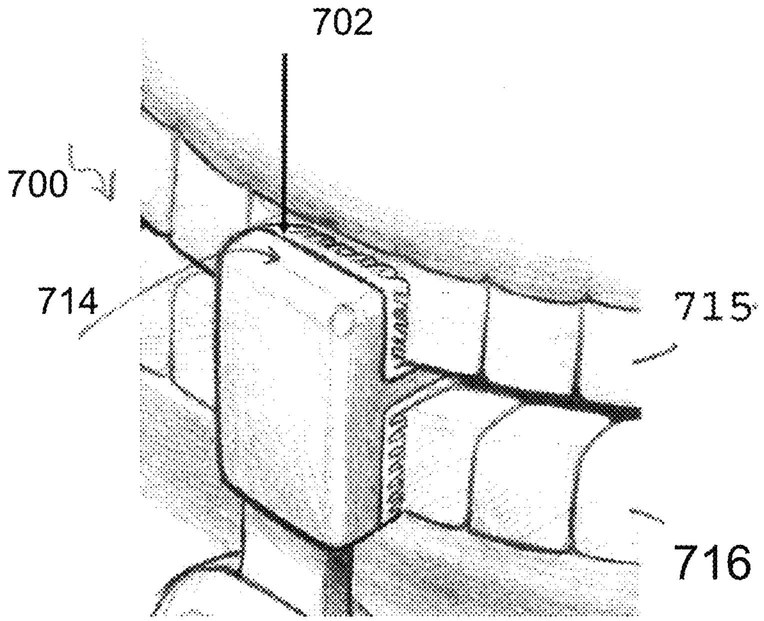

While depicted as teeth 708 the actual shape of the teeth 708 can be varied to increase or decrease the surface are that comes in contact with the teeth to increase or decrease the force required to remove the intraoral tool 700. For example, the teeth are lines that cross either along the longitudinal axis of the patient's teeth, perpendicular to the longitudinal axis of the teeth, at an angle to the longitudinal axis of the teeth, in a wave shape, in a regular or irregular shape, and the teeth have any shapes such as cylindrical, square, round, pyramidal, trapezoidal, have an angular shape that is either angled toward or away from the longitudinal axis of the teeth (thus compressing or decompressing when the device is inserted or removed), of any combinations thereof. The teeth of the tool mounting bracket 702 may be colored to represent the level of friction required to place and/or remove the tool intraoral 700, or the size of the upper and lower openings 704, 706 for, e.g., pediatric versus adult users. Further, a cavity 710 is depicted in tool mounting bracket 702 that allows for the insertion of the tool handle 712 such that the length of the tool handle 712 can be varied during operation. In FIG. 7B the tool handle 712 is shown extending past the upper surface 714 of the tool mounting bracket 702. The material for the tool handle 712 is selected such that the excess material can be cut off and be generally flush with the upper surface 714 of the intraoral tool 700 when used in operation, as shown in in FIG. 7C, connected to both upper and lower teeth 715, 716.

Figure 8A:
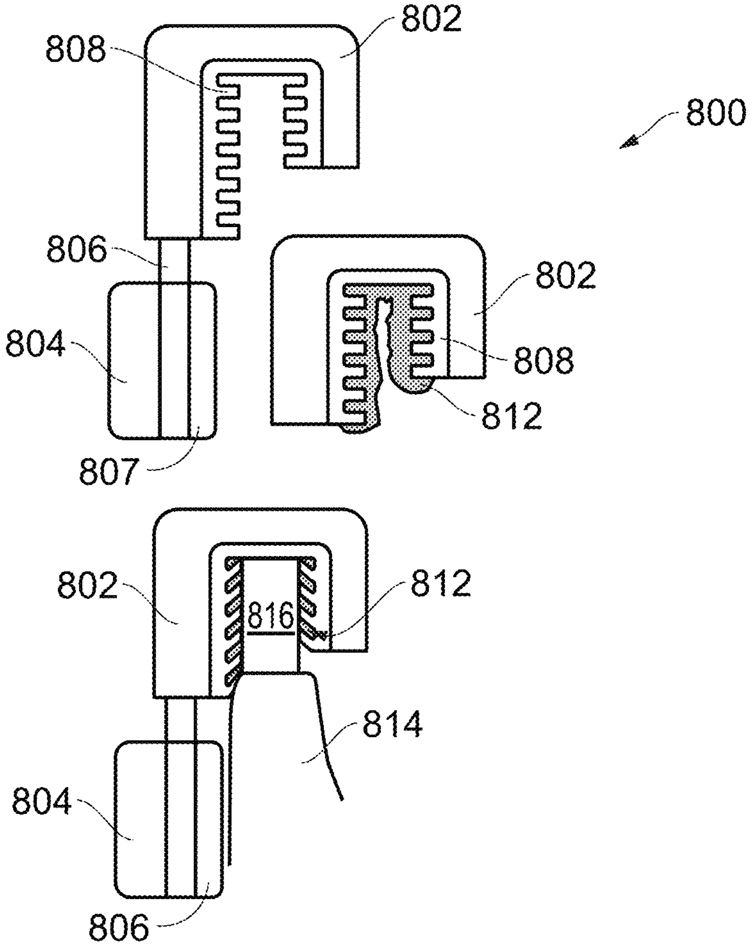
FIG. 8A shows cross-sectional side views.
Figure 8B:
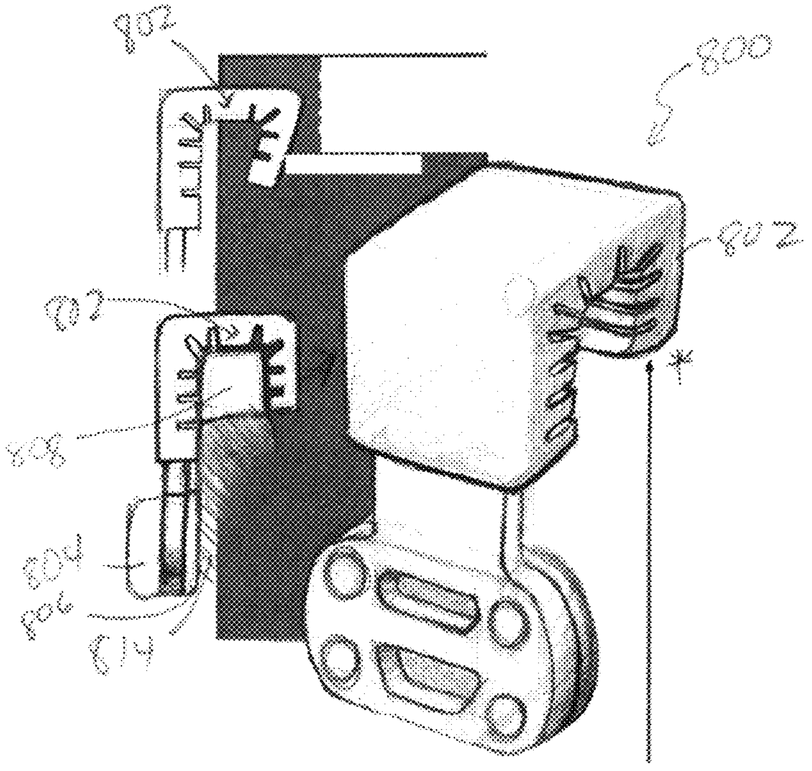
FIG. 8B shows an isometric view, of the intraoral tool of the present invention.

FIG. 8A shows cross-sectional side views of the intraoral tool 800 that shows the tool mounting bracket 802 having teeth 808, front insert 804, the tool handle 806 and shown in an inset with an adhesive 812, which may be a standard denture adhesive. The bottom figure shows the intraoral tool 800 with resilient teeth 808 compressed against patient's teeth 816 and showing the tool handle 806 at or about the gum line 814. FIG. 8B shows an isometric view of another embodiment of the intraoral tool 800 that shows the tool mounting bracket 802, the front insert 804, the flat back insert 807, the tool handle 806 having teeth 808 formed by curving the tool mounting bracket 802 from the same material with a resilient frame within the tool mounting bracket 802 that extends from the tool handle 806, and which may have an inward bias or flex, such that the tool mounting bracket 802 attaches to the teeth 816 and the front insert 804 and a flat back insert 806 are shown, and the flat back insert 806 can be in contact with the gum line 814.

Figure 9A:
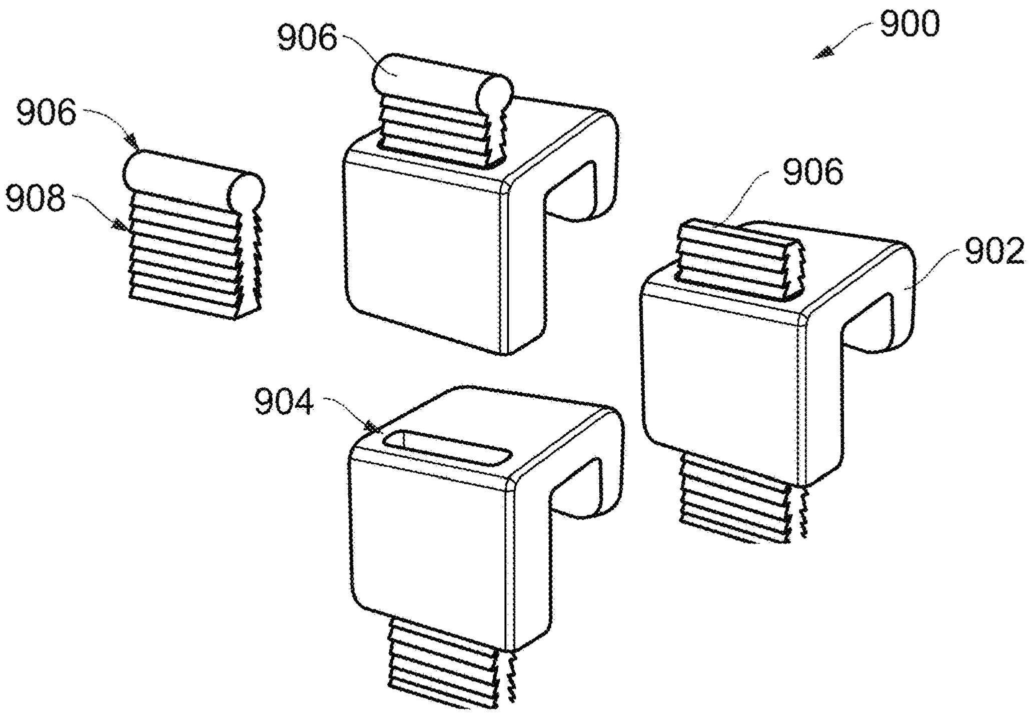
FIGS. 9A to 9C show another embodiment of the intraoral tool of the present invention.
Figure 9B:
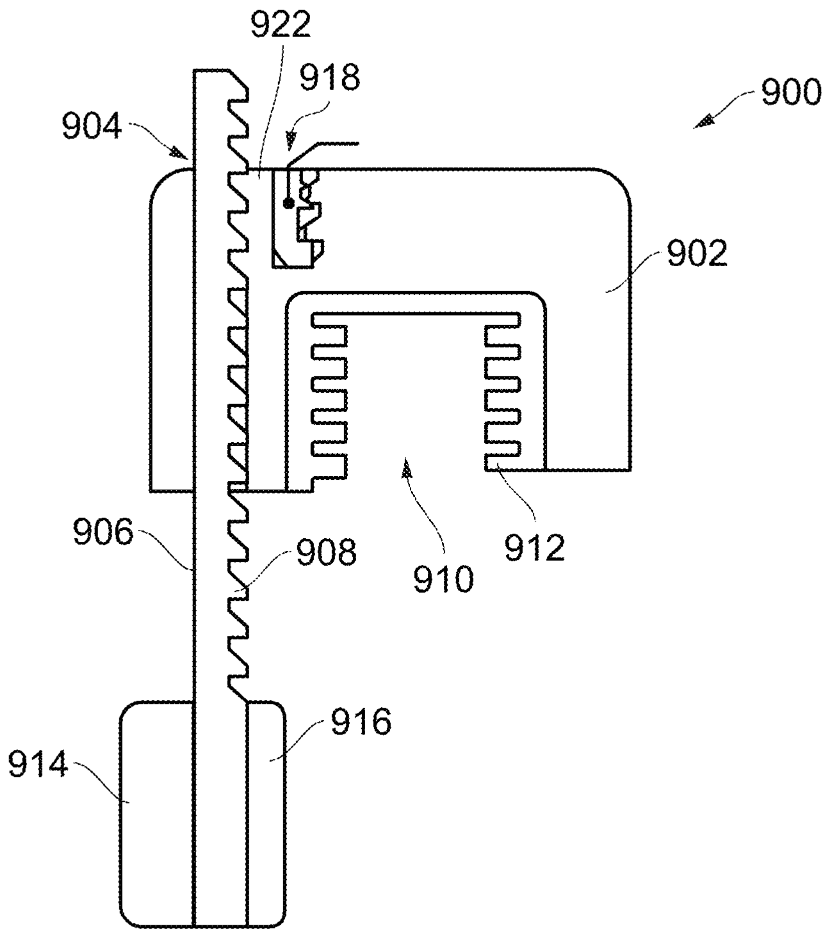

FIG. 9A shows another embodiment of the intraoral tool 900 of the present invention. The tool mounting bracket 902 is shown having an opening 904 into which a tool handle 906 having resilient teeth 908 is inserted. The tool handle 906 is able to protrude from the cavity or opening 904 until the length of the tool handle 906 is adjusted and optimized, and the excess can then be trimmed. FIG. 9B is a cross-section side view of the intraoral tool 900 of the present invention, in which the tool mounting bracket 902 is shown having an opening 904 into which a tool handle 906 having resilient teeth 908 is inserted.

Figure 9C:
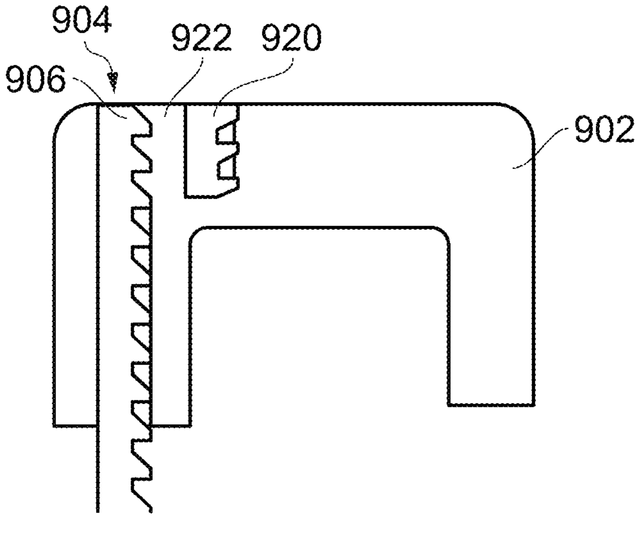

The opening 910 has teeth 912 that attach to the patient's teeth (not shown). The resilient teeth 908 may have a "zip-tie" configuration that is biased such that the tool handle 906 is only able to travel in one direction (upward in this embodiment), however, the teeth 912 may also be formed such that the tool handle 906 is able to travel and be adjusted in either an upward and/or downward direction. The front insert 914 and back flat insert 916 are also depicted. An opening 918 that is adjacent a zip lever 922 and that can be used to lock the tool handle 906 into the tool mounting bracket 902 is also depicted. In this example, shown in conjunction with FIG. 9C, an excess of the tool handle 906 is cut from the top of the tool handle 906 and the excess portion 920 is inserted into opening 918 such that it locks the zip lever 922 from flexing, thereby locking the tool handle 906 onto the tool mounting bracket 902.

Figure 10A:
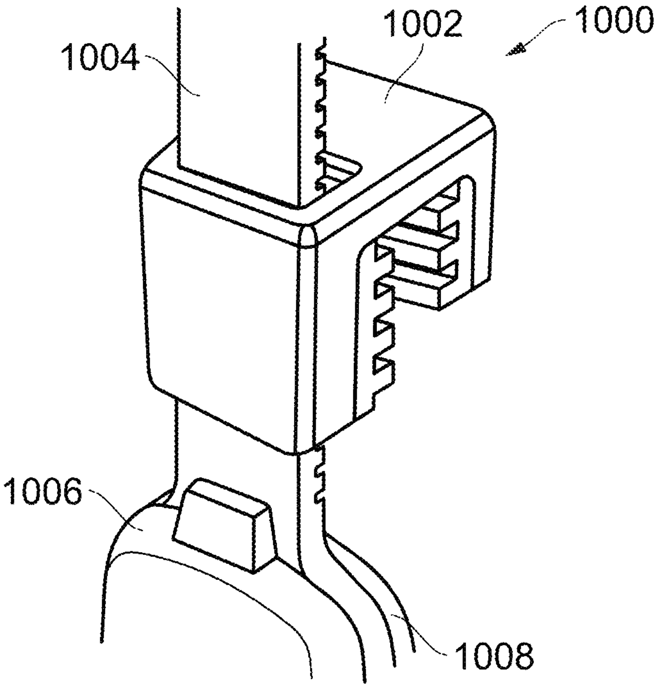
FIGS. 10A and 10B show isometric views of another embodiment of the intraoral tool that attaches to a single tooth or row of teeth of the present invention.
Figure 10B:
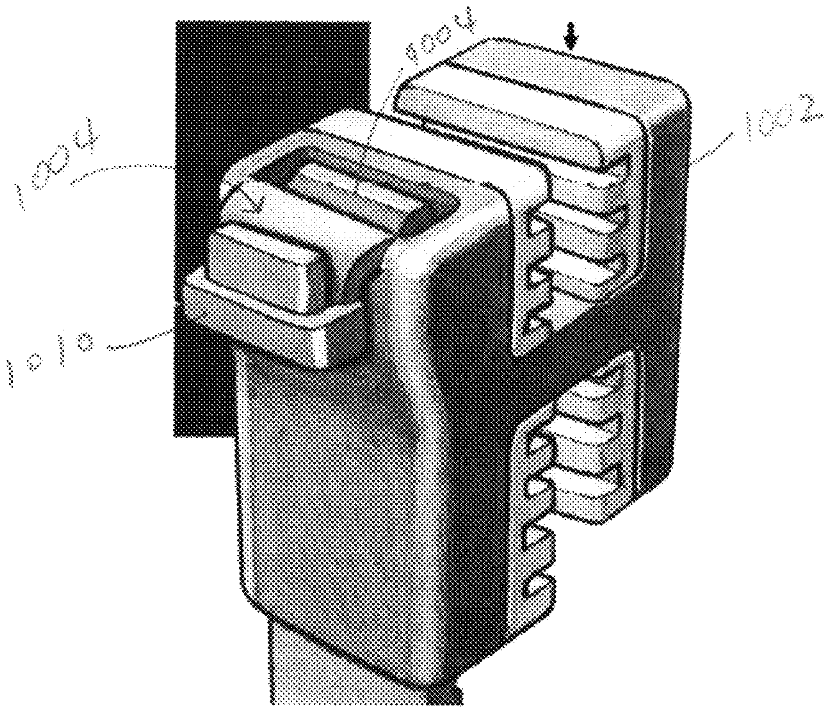

FIGS. 10A and 10B show isometric views of another embodiment of the intraoral tool 1000 shown with a tool mounting bracket 1002 that attached to a single tooth or row of teeth (not depicted) (FIG. 10A) or to a lower and upper tooth or teeth (not depicted) (FIG. 10B). In FIG. 10A, the tool handle 1004 extends beyond the top of the tool mounting bracket 1002, and also shows the front insert 1006 and back flat insert 1008. In FIG. 10B, a silicone cap 1010 is depicted that is inserted into the lever back cavity so as to prevent height re-adjustment of the tool handle 1004.

Figure 11A:
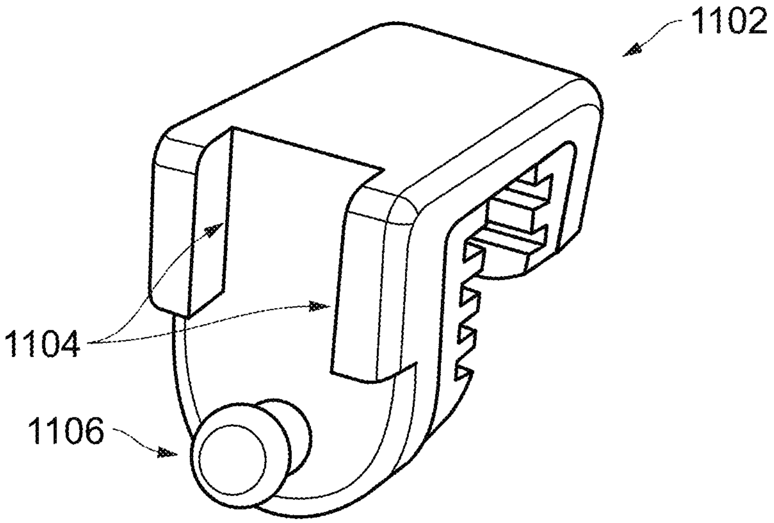
FIGS. 11A to 11C show yet another embodiment of the intraoral tool shown that includes vertical rails and a locking stub or peg.
Figure 11B:
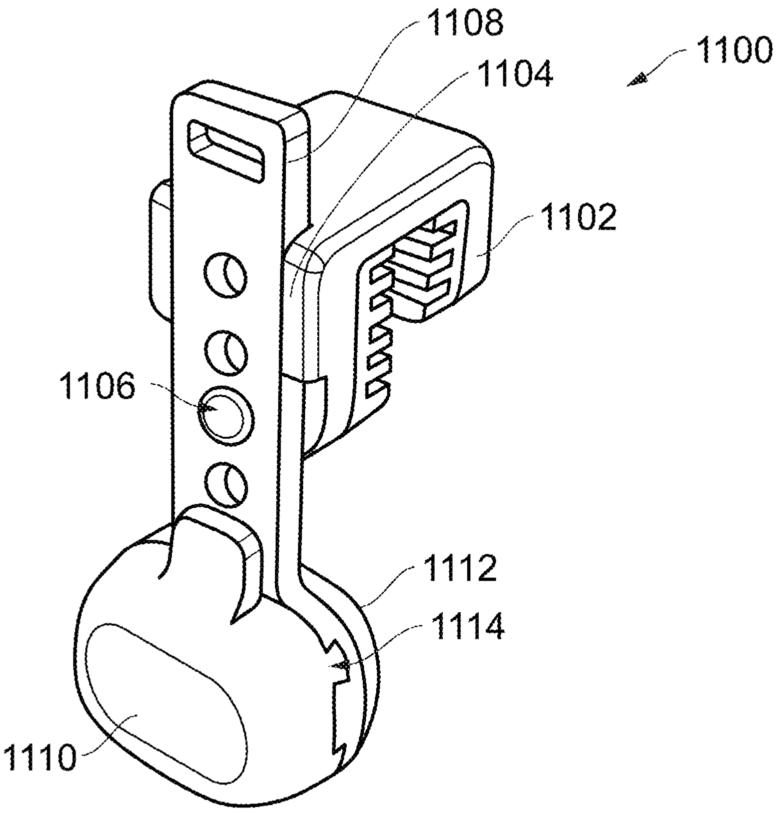
Figure 11C:
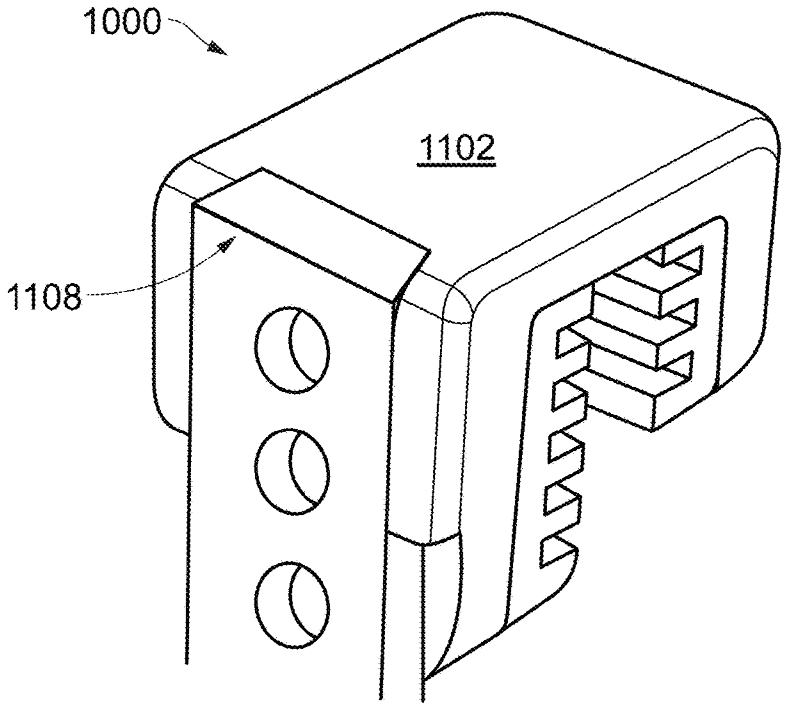

FIGS. 11A and 11B show yet another embodiment of the intraoral tool 1100 shown with a tool mounting bracket 1102, that includes vertical rails 1104 and a locking stub or peg 1106. In operation, as shown in FIG. 11B, the intraoral tool 1100 includes the tool connected to the tool handle 1108, the front insert 1110 and the back flat insert 1112, connected via a dovetail joint 1114 formed between front insert 1110 and back flat insert 1112 to attach them to the tool handle 1108. FIG. 11C also shows an isometric view of the intraoral tool 1100 after the excess has been trimmed from the tool handle 1108.

Figure 12A:
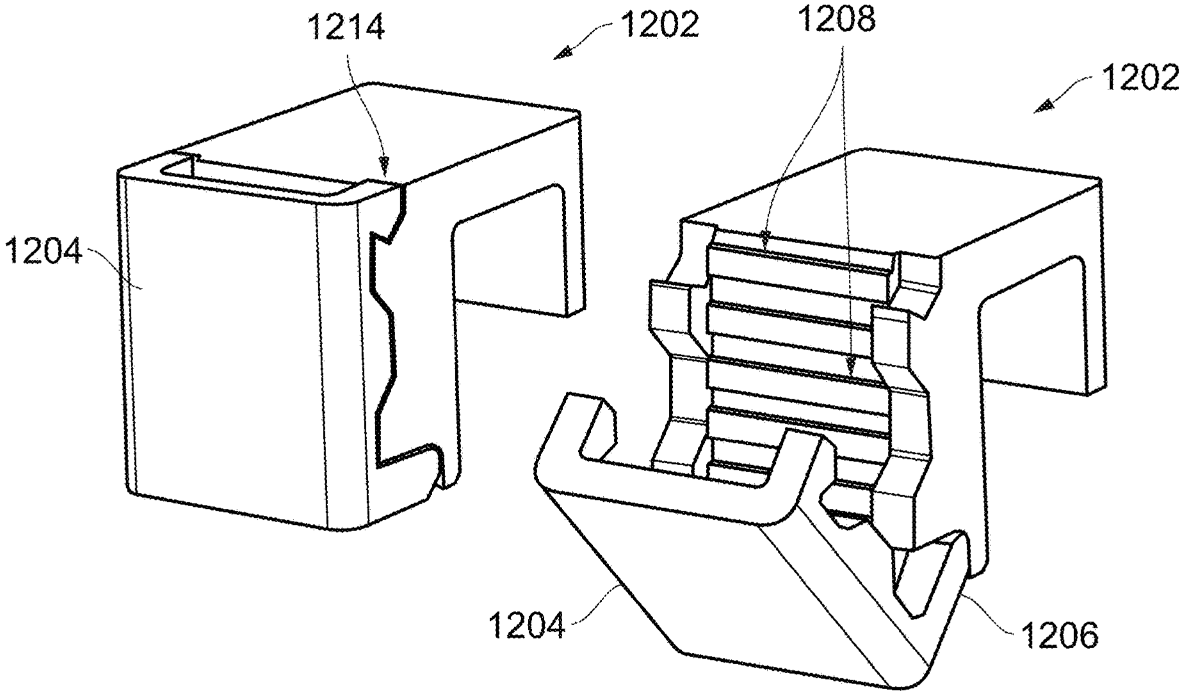
FIGS. 12A to 12C show yet another embodiment of the intraoral tool with a locking cover.
Figure 12B:
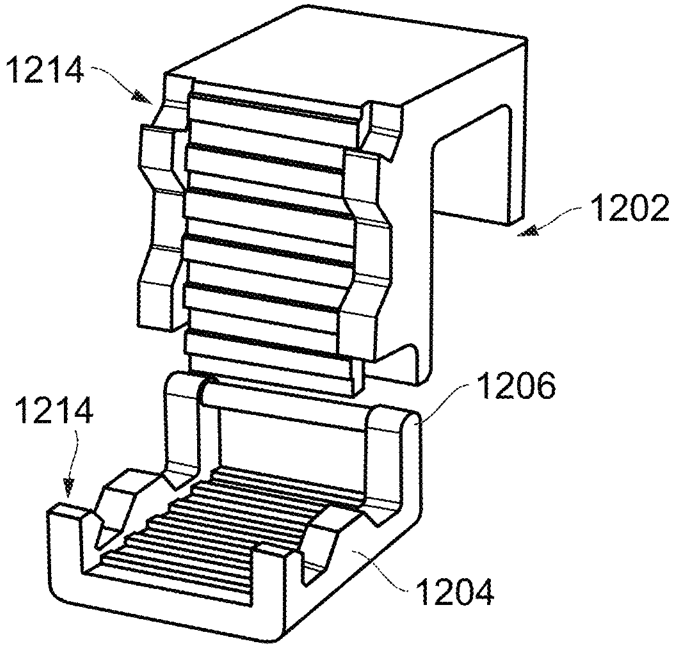
Figure 12C:
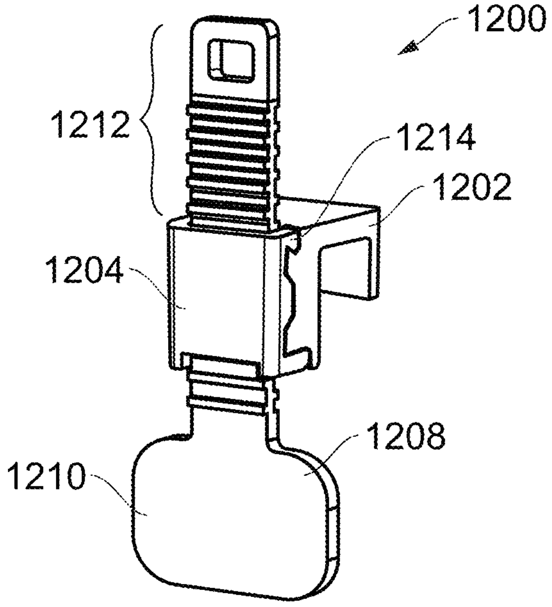

FIGS. 12A to 12C show yet another embodiment of the intraoral tool 1200. FIG. 12A shows the tool mounting bracket 1202 in a closed (left) and open (right) position, that includes a locking cover 1204 that has a hinge 1206 at a bottom end (the hinge may also be on a top or one of the sides (not depicted)) and one or more teeth (not shown) and a locking feature 1214. FIG. 12B shows an exploded view of the tool mounting bracket 1202 with a hinge 1206 on the locking cover 1204, which hinge 1206 which can be inserted into a matching cavity of the tooth clamp, however, the skilled artisan will recognize that the configuration may be the opposite, in which the hinge may be on the tool with teeth on the locking cover 1204. FIG. 12C shows the intraoral tool 1200 that also includes the tool handle 1208 that is inserted between the tool mounting bracket 1202 and the locking cover 1204, with the tool handle 1208 shown in this version without any insert. An excess 1212 of the tool handle 1208 can be trimmed once the length of the tool handle 1208 has been optimized and the locking cover 1204 closed, which cover can be locked into place by a locking feature 1214.

Figure 13A:
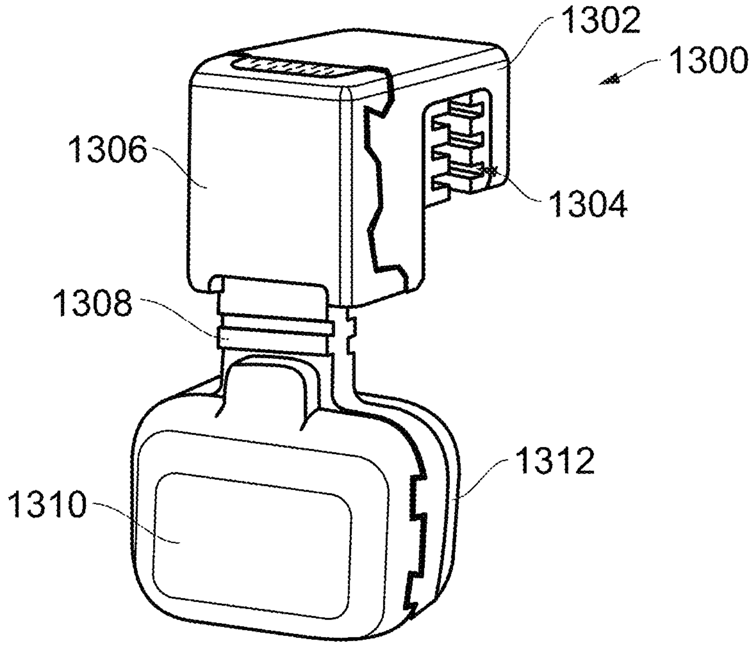
FIGS. 13A and 13B show the intraoral tool of the present invention assembled (FIG. 13A) and in operation (FIG. 13B).
Figure 13B:
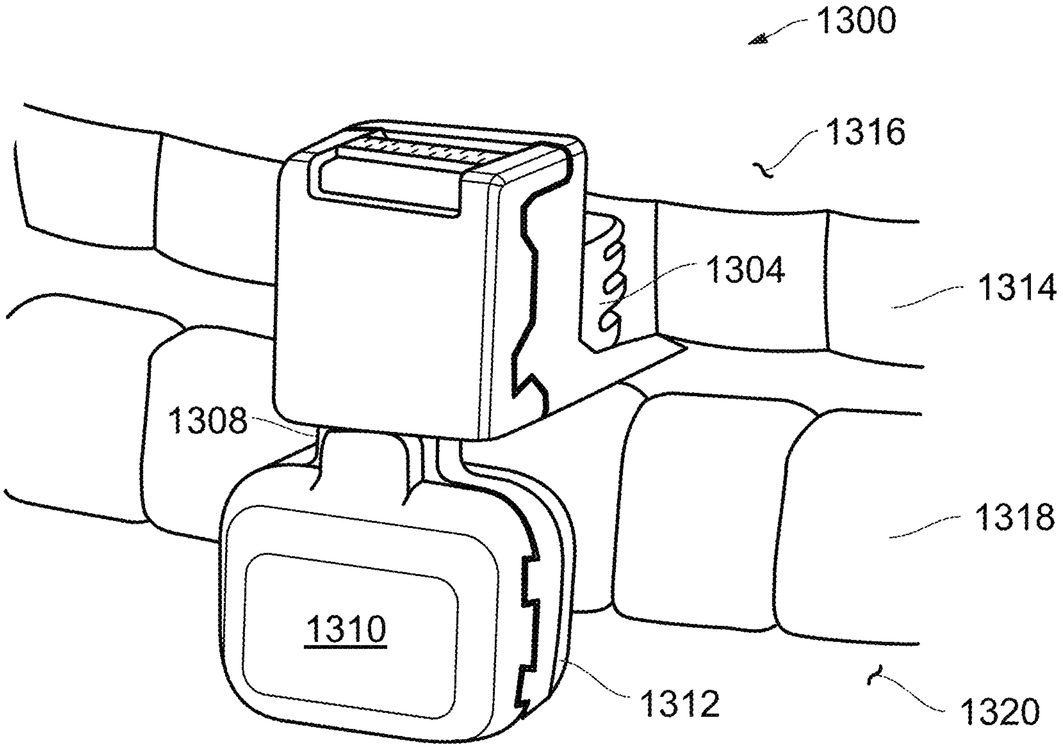

FIGS. 13A and 13B show an intraoral tool 1300 assembled (FIG. 13A) and in operation (FIG. 13B). In FIG. 13A the tool mounting bracket 1302 has a tooth grip 1304 and a locking cover 1306, that locks the tool handle 1308 onto the tool mounting bracket 1302, and also includes the front insert 1310 and back flat insert 1312. In this embodiment, the tooth grip 1304 has a downward opening to attach to either the patient's lower or upper teeth with the opening in the same direction as the tool handle 1308 and front insert 1310 and back flat insert 1312. In FIG. 13B, the opposite is shown with regard to the opening of the tooth grip 1304, in which the opening faces in the direction opposite the tool handle 1308 and front insert 1310 and back flat insert 1312, such that the back flat insert 1312 interacts with the lower gum line 1320 of the patient's lower teeth 1318, while the tool mounting bracket 1302 attached the upper row of teeth 1314, and not the gum line 1316. Of course, the intraoral tool 1300 can be reversed to attach the patient's lower teeth 1318, and the back flat insert 1312 interacts with the upper gum line 1316 (not depicted).

Figure 14A:
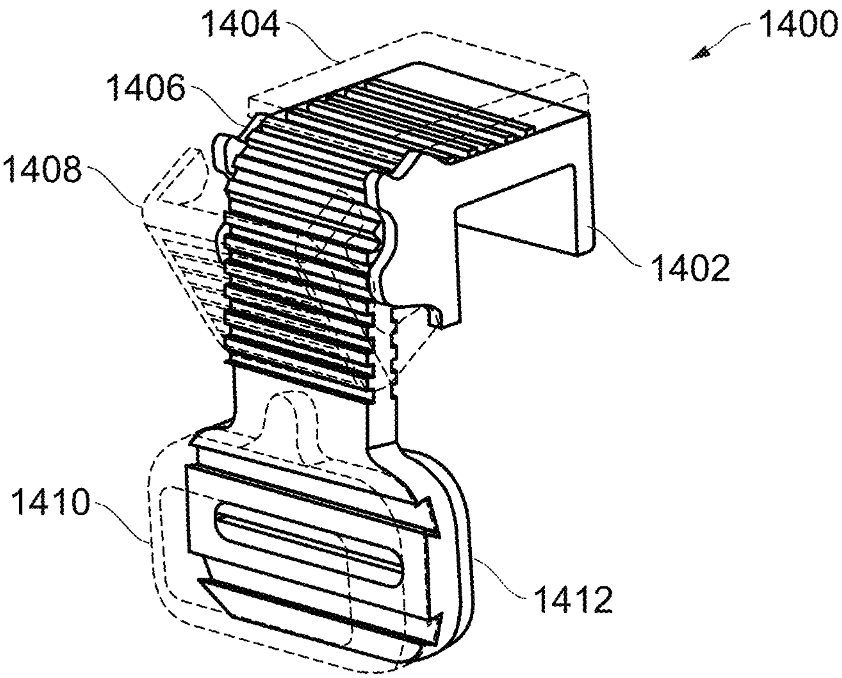
FIGS. 14A and 14B are isometric views showing the internal features of the intraoral tool of the present invention after assembly.
Figure 14B:
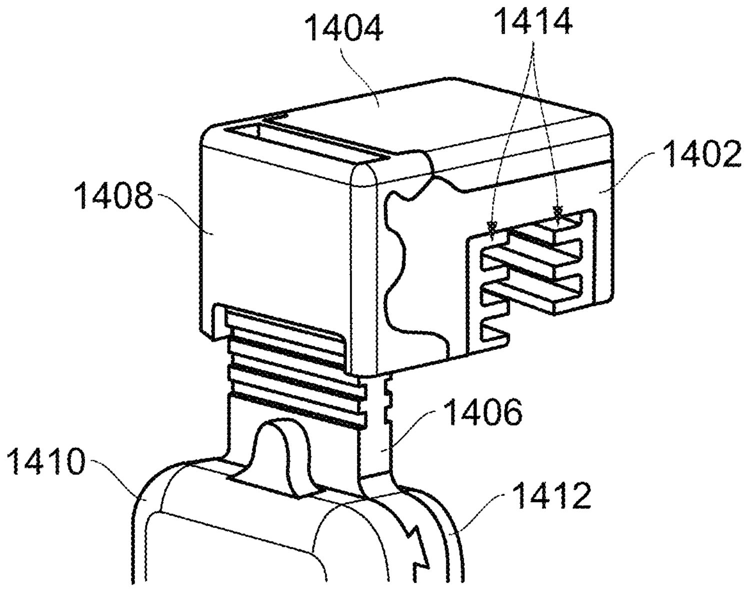

FIGS. 14A and 14B are isometric views showing the internal features of the intraoral tool 1400 after assembly, showing the tool mounting bracket 1402 that in this embodiment has an upper cover 1404 into which the excess of the tool handle 1406 is inserted, and the locking cover 1408, that locks the tool handle 1406 onto the tool mounting bracket 1402. The tool handle 1406 can be a resilient material to provide flexion between the tool mounting bracket 1402 and the tool handle 1406 portion that includes the front insert 1410 and the flat back insert 1412. In FIG. 14B, the intraoral tool 1400 is depicted having the tooth grip 1414 that has horizontal teeth, but the teeth can be diagonal, vertical, dots, squares, spheres, triangles or any combination of shapes so long as the tool mounting bracket 1402 attached to a patient's teeth.

In one embodiment of the intraoral tool may include the following: tool that is configured to couple to the insert or the tool handle, wherein the mounting bracket is configured to hold the insert substantially stationary in the patient's mouth. The adjustable height is obtained using a firm or a semi-flexible tool handle to achieve depth within mouth. The tool handle can include a ratchet adjustable band or fold over hinge lock or other method of secure attachment. The intraoral tool may include a finger lift recess to remove insert from tool. For example, the insert slides onto the tool mounting bracket or tool handle and includes rails to reduce the risk of popping off, and/or the insert push onto the intraoral tool ("pop on") to secure them. As shown herein, the tool mounting bracket is configured for upper or lower teeth or both. Typically, the intraoral tool, mounting bracket, the front insert, and/or the back flat insert have rounded edges for comfort.

In another embodiment of the present invention the mounting bracket includes a mechanism to use bite pressure to keep insert stable. For example, the tool mounting bracket includes resilient surfaces and/or adhesives to hold the tool and inserts in the mouth such as pliable/moldable silicone mouthpiece that fits over/around the tooth/teeth and conforms to the shape of the tooth/teeth, or silicone grips lining the surface of the opening that contacts the tooth/teeth, or a retainer-like portion which fits against the palate or underneath tongue and approximates the teeth is also used with the present invention.

In another embodiment the intraoral tool is integrally coupled to the insert for example, non-detachably coupled to the insert, or detachably coupled to the insert. The inserts may sit flush against the gums and teeth. The tool may include adjustable features to move the insert of the intraoral tool against gum line.

Alternatively, the intraoral tool may include attachment points for one or more tool handle or inserts to allow for wider range of control or attachment. Thus, the intraoral tool may also have exchangeable shapes with the use of 1 or 2 tool mounting brackets and multiple inserts at one time. In another embodiment, the insert is inflatable, for example, the device can include a luer-lock or other such attachment that allows for the use of a syringe to inflate the insert(s) to provide a varying amount of stretch to the skin and muscles as required by the patient's needs by increasing the pressure within the inflatable insert. For example, tubing attaches to the luer-lock on one end and insert on the other that is made from any compatible material, e.g., silicone, plastic, rubber, or other resilient polymer. In one version, the tubing is attached outside of mouth for better stability. The intraoral tool is configured to deliver at least low load prolonged passive stretch to the patient via solid or inflatable inserts.

The methods for use with the present invention also include varying the degree of stretch based on size of the insert or degree of inflation. Thus, when prescribed, the present invention includes the amount of flexion, or length and width of the tool to be used and/or prescribed. For example, the degree of stretch for an inflatable insert is used because there are infinite sizing options rather than fixed with the solid insert non-removably attached to the tool handle, which only come in small, medium, and large sizes.

The intraoral tool can also be configured to prevent or reduce an impact of scar tissue or to reduce an appearance of scar tissue.

In another embodiment, in addition to the fixed tool handle, is the use of a variable length tool handle or "adjustable band", that has ridges which the intraoral tool will slide/couple onto and then the insert will attach to the tool mounting bracket. The ridges allows variability in how far from the end of the adjustable band the tool mounting bracket is coupled, allows treatment to different areas of the mouth.

Another embodiment is that the adjustable band has the ridges down the entire length allowing the tool mounting bracket to be able to couple anywhere on the adjustable band. In operation, once the tool mounting bracket is coupled to the band the unused band is folded over and snapped off.

The skilled artisan will recognize that use of intraoral tool 100 and method 300 enable delivery of treatment to patients with facial burns, increasing ROM and elasticity and reducing the impact and appearance of scarring on skin and musculature, among other benefits. The skilled artisan will also recognize that various embodiments of the present invention may be used with patients with hypertonic facial muscles, patients with lip contractures, and patients with oral motor deficits.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of." As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step, or a limitation) or group of integers (e.g., feature(s), element(s), characteristic(s), property(ies), method/process(s) steps, or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about," "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or methods of this invention have been described in terms of particular embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope, and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

To aid the Patent Office, and any readers of any patent issued on this application in interpreting the claims appended hereto, applicants wish to note that they do not intend any of the appended claims to invoke 35 U.S.C. § 112(f) as it exists on the date of filing hereof unless the words "means for" or "step for" are explicitly used in the particular claim.

REFERENCES

[1] Clayton N A, Ward E C, Maitz P K M. Orofacial contracture management outcomes following partial thickness facial burns. *Burns.* 2015; 41(6):1291-1297.

[2] Clayton N A, Ward E C, Maitz P K. Intensive swallowing and orofacial contracture rehabilitation after severe burn: A pilot study and literature review. Burns. 2017; 43(1): e7-e17.

[3] Macintyre L, Baird M. Pressure garments for use in the treatment of hypertrophic scars—a review of the problems associated with their use. Burns. 2006; 32(1):10-15.

[4] Atiyeh B S, El Khatib A M, Dibo S A. Pressure garment therapy (PGT) of burn scars: evidence-based efficacy. Annals of Burns and Fire Disasters. 2013; 26(4):205-212.

[5] Clayton N A, Ward E C, Scott A, Maitz P K. Orofacial contracture management: current patterns of clinical practice in Australian and New Zealand adult burn units. J Burn Care Res. 2017; 38:e204-e211.

[6] Parry I, Sen S, Palmieri T, Greenhalgh D. Nonsurgical scar management of the face: Does early versus late intervention affect outcome? Journal of Burn Care and Research. 2013; 34(5):569-575.

[7] Hadlock T A, Urban L S. Toward a universal, automated facial measurement tool in facial reanimation. *Arch Facial Plast Surg.* 2012; 14(4):277-282.

[8] Marur T, Tuna Y, Demirci S. Facial anatomy. *Clinics in Dermatology.* 2014; 32(1):14-23.

[9] Jorge Jr J J, Pialarissi P R, Borges G C, Squella S A F, de Gouveia Md F, Saragiotto Jr J C, Goncalves V R. Objective computerized evaluation of normal patterns of facial muscles contraction. Braz J Otorhinolaryngol. 2012; 78(2):41-51.

[10] Feng G, Zhuang Y, Gao Z. Measurement and analysis of associated mimic muscle movements. Journal of Otology. 2015; 10:39-45.

[11] Coulson S E, Croxson G R, Gilleard W L. Quantification of the three-dimensional displacement of normal facial movement. Ann Otol Rhinol Laryngol. 2000; 109: 478-483.

[12] VanSwearingen J M, Brach J S, Stratford P W. The facial disability index: reliability and validity of a disability assessment instrument for disorders of the facial neuromuscular system. Physical Therapy. 1996; 76(12): 1288.

What is claimed is:

1. An intraoral tool for prolonged stretch of a skin and musculature, comprising:

one or more inserts comprising at least one flat surface to ensure stability within a mouth of a patient used for a delivery of a prolonged stretch of the skin, the musculature, or both, to treat a patient's facial injury or disorder, wherein a treatment with the one or more inserts is prolonged stretch of the skin, the musculature, or both, wherein the one or more inserts provide for multiple planes of stretch; and a tool handle or a tool mounting bracket coupled to the one or more inserts, wherein the tool handle is used to manipulate the one or more inserts in a patient's mouth, wherein the inserts are selected from at least one of:

a disk, a partial disk, a cylinder, an L shape, a rectangle, a triangle, a trapezoid, a polygon, a rhomboid, a polyhedron, an oval, or a crescent that is convex or concave, and the one or more inserts are solid, inflatable, or pliable.

2. The intraoral tool of claim 1, wherein the one or more inserts are inflated to change either a size, shape, or the size and the shape of the insert;

the one or more inserts are configured to be positioned in the mouth with the tool handle, mounted to an end of the tool handle;

the one or more inserts are shaped to treat an injury or disorder that affects at least one of a cheek, a nasolabial fold, a lip, a mentolabial junction, or a modiolus.

3. The intraoral tool of claim 1, further comprising one or more interchangeable inserts formed in a same, or a substantially similar shape as the one or more inserts, wherein the one or more interchangeable inserts are larger or smaller than one or more inserts.

4. The intraoral tool of claim 1, wherein the one or more inserts are integrally coupled to the tool handle or tool mounting bracket, are non-detachably coupled to the tool handle or tool mounting bracket, or are detachably coupled to the tool handle or tool mounting bracket.

5. The intraoral tool of claim 1, wherein the tool handle comprises a flat surface for positioning against teeth or gum of the patient for stabilizing the one or more inserts in a desired or target location of the patient's mouth;

the tool handle is comprised of a material that is bendable into a shape used to position the one or more inserts in the desired or target location of the patient's mouth, comprises an excess that can be trimmed to adjust a depth of the one or more inserts, or is elongate, paddle shaped; or the intraoral tool comprises a tool mounting bracket, wherein the tool mounting bracket is capable of affixing the intraoral tool to teeth of the patient or inside the patient's mouth.

6. The intraoral tool of claim 5, wherein the tool mounting bracket further comprises: a clamp for selectively positioning the tool mounting bracket on the teeth of the patient, the tool mounting bracket is formed with upper and lower openings for gripping both upper and lower teeth of the patient, the tool mounting bracket is a bite wing retainer configured to hold the one or more inserts substantially stationary in the patient's mouth, or the tool mounting bracket is at least partially adhered to the teeth with an adhesive.

7. The intraoral tool of claim 1, wherein a surface of the tool handle or the tool mounting bracket, respectively, is substantially flat, convex, concave, or has teeth, indentations, or ridges, or a plurality of teeth that locks the tool handle into the one or more inserts or the tool mounting bracket.

8. The intraoral tool of claim 1, wherein the intraoral tool is configured to at least one of: deliver a prolonged passive stretch treatment to the patient; deliver at least range of motion treatment to the patient; increase a range of motion of the patient; reduce an impact of scar tissue; or to reduce an appearance of scar tissue.

9. The intraoral tool of claim 1, wherein the one or more inserts are configured to treat at least one of a levator labii superioris, levator labii superioris alaeque nasi, buccinator, depressor anguli oris, mentalis, zygomaticus major, zygomaticus minor, nasalis, levator anguli oris, depressor septi, risorus, depressor labii inferioris, or orbicularis oris.

10. A method of intraoral treatment of a patient, comprising:

providing an intraoral tool comprising one or more inserts having at least one shape connected to a tool handle or a tool mounting bracket, wherein the one or more inserts are selected to provide an intraoral treatment of a facial injury or disorder, wherein the intraoral tool is configured to permit manipulation of the one or more inserts in a patient's mouth; and delivering one or more treatments to the patient to treat the facial injury or disorder, wherein the treatment is a prolonged stretch of a skin and musculature, wherein at least one of the shapes of the one or more inserts is capable of holding the intraoral tool in a substantially stationary position with the one or more inserts or tool mounting bracket in the patient's mouth;

at least one of the shapes of the one or more inserts has the shape or cross-section of a disk, a partial disk, a cylinder, an L shape, U shape, a rectangle, a triangle, a trapezoid, a polygon, a rhomboid, a polyhedron, an oval, or a crescent;

a surface of the one or more inserts, the tool handle or the tool mounting bracket is substantially flat, convex, concave, or has teeth, indentations, or ridges;

the one or more inserts, the tool handle, or the tool mounting bracket has a substantially flat back surface, a convex front surface, ridges, teeth, indentations, or a zip lever and an opening for locking the tool handle into the one or more inserts, the one or more inserts comprises one or more pliable materials, or the one or more pliable materials include silicone or plastic;

the one or more inserts are inflatable; or the tool handle is at least one of: integrally coupled to the one or more inserts, non-detachably coupled to the one or more inserts, or detachably coupled to the one or more inserts.

11. The method of claim 10, wherein the injury or disorder affects at least one of a cheek, a nasolabial fold, a lip, a mentolabial junction, or a modiolus.

12. The method of claim 10, the tool mounting bracket is an elongate, paddle-shaped tool mounting bracket configured to hold the one or more inserts substantially stationary in the patient's mouth, wherein the tool mounting bracket is integrally coupled to the one or more inserts, non-detachably coupled to the one or more inserts, or detachably coupled to the one or more inserts.

13. The method of claim 10, further comprising bending the tool handle into a plurality of shapes, adjusting a length of the tool handle, or trimming an excess of the tool handle.

14. The method of claim 10, wherein the one or more treatments of the facial injury or disorder include passive stretch treatment or range of motion treatment, to increase range of motion, reduce an impact of scar tissue, or reduce an appearance of scar tissue or both.

15. The method of claim 10, further comprising using the intraoral tool to treat at least one of: a levator labii superioris, levator labii superioris alaeque nasi, buccinator, depressor anguli oris, mentalis, zygomaticus major, zygomaticus minor, nasalis, levator anguli oris, depressor septi, risorus, depressor labii inferioris, or orbicularis oris, by inserting or manipulating the one or more inserts, the tool handle, or the tool mounting bracket.

16. The method of claim 10, further comprising optimizing a size and shape of the one or more inserts to a size of an oral cavity, a palate, or lips and performing one or more manipulations of the intraoral tool for treating at least one of: a levator labii superioris, levator labii superioris alaeque nasi, buccinator, depressor anguli oris, mentalis, zygomaticus major, zygomaticus minor, nasalis, levator anguli oris, depressor septi, risorus, depressor labii inferioris, or orbicularis oris through a prolonged low load stretch of the musculature.

17. A kit with one or more intraoral tools comprising:

one or more inserts; and one or more tool mounting brackets configured for a delivery of intraoral treatment of a patient's facial injury or disorder, wherein the one or more tool mounting brackets [to] form an intraoral tool configured to permit movement of one of the one or more inserts in a patient's mouth to treat an injury or disorder that affects at least one of a cheek, a nasolabial fold, a lip, a mentolabial junction, or a modiolus, wherein the intraoral tool provides for a prolonged stretch of a skin, a musculature, or both.

18. The kit of claim 17, wherein the intraoral tool is configured to provide a low load prolonged stretch to treat at least one of a levator labii superioris, levator labii superioris alaeque nasi, buccinator, depressor anguli oris, mentalis, zygomaticus major, zygomaticus minor, nasalis, levator anguli oris, depressor septi, risorus, depressor labii inferioris, or orbicularis oris;

the intraoral tools are grouped by a size and a shape of the one or more inserts to provide optimal low load prolonged stretch to facial muscles; or the one or more inserts are attached to the one or more tool handles or intraoral mounting bracket based on defined criteria for optimal benefit based on patient needs.

19. A method of intraoral treatment of a patient, comprising:

providing an intraoral tool comprising one or more inserts connected to a tool handle or a tool mounting bracket, wherein the one or more inserts are selected to provide an intraoral treatment of a facial injury or disorder, wherein the intraoral tool is configured to permit manipulation of the one or more inserts in a patient's mouth; and delivering one or more treatments to the patient to treat the facial injury or disorder, wherein the intraoral tool provides for a prolonged stretch of a skin, a musculature, or both;

further comprising a bending tool used to bend the tool handle into a plurality of shapes, adjusting a length of the tool handle, wherein the bending tool has a plurality of teeth for ratcheting into the tool mounting bracket, or trimming an excess of the tool handle once the length has been adjusted, and wherein-a shape of the one or more inserts is capable of holding the intraoral tool in a substantially stationary position with the one or more inserts or tool mounting bracket in the patient's mouth; or the shape of the one or more inserts or tool mounting brackets has the shape or cross-section of a disk, a partial disk, a cylinder, an L shape, U shape, a rectangle, a triangle, a trapezoid, a polygon, a rhomboid, a polyhedron, an oval, a crescent; of the one or more inserts or tool mounting brackets has the shape or cross-section of a disk, a partial disk, a cylinder, an L shape, U shape, a rectangle, a triangle, a trapezoid, a polygon, a rhomboid, a polyhedron, an oval, a crescent;

a surface of the one or more inserts, the tool handle or the tool mounting bracket is substantially flat, convex, concave, or has teeth, indentations, or ridges;

the one or more inserts, the tool handle, or the tool mounting bracket has a substantially flat back surface, a convex front surface, ridges, teeth, indentations, or a zip lever and an opening for locking the tool handle into the one or more inserts, the one or more inserts comprises one or more pliable materials, or the one or more pliable materials include silicone or plastic;

the one or more inserts are inflatable; or the tool handle is at least one of: integrally coupled to the one or more inserts, non-detachably coupled to the one or more inserts, or detachably coupled to the one or more inserts.

* * * * *